US010179507B2

(12) United States Patent
Terayama et al.

(10) Patent No.: US 10,179,507 B2
(45) Date of Patent: Jan. 15, 2019

(54) RIGHT AND LEFT MOTOR OUTPUT CONTROL FOR VEHICLE

(71) Applicant: HONDA MOTOR CO., LTD., Tokyo (JP)

(72) Inventors: Yoshito Terayama, Wako (JP); Masaki Negoro, Wako (JP); Tomokazu Honda, Wako (JP); Akiyoshi Kobayashi, Wako (JP); Shintaro Yoshimi, Wako (JP); Yoshifumi Nakamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 19 days.

(21) Appl. No.: 15/108,055

(22) PCT Filed: Dec. 25, 2014

(86) PCT No.: PCT/JP2014/084299
§ 371 (c)(1),
(2) Date: Jun. 24, 2016

(87) PCT Pub. No.: WO2015/099033
PCT Pub. Date: Jul. 2, 2015

(65) Prior Publication Data

US 2016/0318385 A1 Nov. 3, 2016

(30) Foreign Application Priority Data

Dec. 27, 2013 (JP) ................................ 2013-273242

(51) Int. Cl.
*B60K 6/00* (2006.01)
*B60K 6/52* (2007.10)
(Continued)

(52) U.S. Cl.
CPC .................. *B60K 6/52* (2013.01); *B60K 6/48* (2013.01); *B60L 3/0046* (2013.01); *B60L 11/12* (2013.01);
(Continued)

(58) Field of Classification Search
CPC .......................... B60L 11/12; B60W 2510/246
(Continued)

(56) References Cited

U.S. PATENT DOCUMENTS 9,139,195 B2 * 9/2015 Noguchi .................. B60K 1/02
2004/0163860 A1 * 8/2004 Matsuzaki ............... B60K 6/44
180/65.225

(Continued)

FOREIGN PATENT DOCUMENTS

JP 11-8909 A 1/1999
JP 2008-222070 A 9/2008

(Continued)

OTHER PUBLICATIONS

International Search Report dated Mar. 31, 2015, issued in counterpart International Application No. PCT/JP2014/084299 (2 pages).

*Primary Examiner* — Julio C. Gonzalez Ramirez
(74) *Attorney, Agent, or Firm* — Westerman, Hattori, Daniels & Adrian, LLP

(57) ABSTRACT

Provided is a vehicle in which overdischarge of a battery is protected and turning drivability of the vehicle is improved when there is even a little remaining capacity. An ECU controls the left motive force and the right motive force of the left electric motor and the right electric motor so as not to exceed a differential torque upper limit value, which is the maximum value of the difference between the left motive force and the right motive force established on the basis of the temperature or discharge limit power of the battery. When the battery is at a low temperature or the like and the
(Continued)

discharge power is limited, the difference between the left motive force and the right motive force is controlled on the basis of the discharge limit power, whereby the turnability of the vehicle is improved while preventing the risk of damage to the battery.

9 Claims, 15 Drawing Sheets

(51) Int. Cl.

| | |
|---|---|
| ***B60W 10/08*** | (2006.01) |
| ***B60W 10/26*** | (2006.01) |
| ***B60W 20/00*** | (2016.01) |
| ***B60K 6/48*** | (2007.10) |
| ***B60W 30/18*** | (2012.01) |
| ***B60W 20/13*** | (2016.01) |
| ***B60L 11/12*** | (2006.01) |
| ***B60L 11/14*** | (2006.01) |
| ***B60L 15/20*** | (2006.01) |
| ***B60W 20/10*** | (2016.01) |
| ***B60L 3/00*** | (2006.01) |
| ***B60L 11/18*** | (2006.01) |
| ***B60W 30/045*** | (2012.01) |
| *B60K 7/00* | (2006.01) |

(52) U.S. Cl.

CPC ........... *B60L 11/14* (2013.01); *B60L 11/1859* (2013.01); *B60L 15/2036* (2013.01); *B60L 15/2045* (2013.01); *B60W 10/08* (2013.01); *B60W 10/26* (2013.01); *B60W 20/00* (2013.01); *B60W 20/10* (2013.01); *B60W 20/13* (2016.01); *B60W 30/045* (2013.01); *B60W 30/18145* (2013.01); *B60K 7/0007* (2013.01); *B60L 2220/42* (2013.01); *B60L 2240/545* (2013.01); *B60L 2260/28* (2013.01); *B60W 2510/246* (2013.01); *B60W 2710/083* (2013.01); *B60W 2720/406* (2013.01); *B60Y 2200/92* (2013.01); *B60Y 2300/188* (2013.01); *B60Y 2300/60* (2013.01); *B60Y 2300/91* (2013.01); *B60Y 2400/82* (2013.01); *Y02T 10/6221* (2013.01); *Y02T 10/6265* (2013.01); *Y02T 10/645* (2013.01); *Y02T 10/648* (2013.01); *Y02T 10/705* (2013.01); *Y02T 10/7005* (2013.01); *Y02T 10/7283* (2013.01); *Y10S 903/916* (2013.01)

(58) Field of Classification Search

USPC ......... 290/40 R, 40 C, 45; 180/65.26, 65.29, 180/65.51, 65.265

See application file for complete search history.

(56) References Cited

U.S. PATENT DOCUMENTS

| | | | | |
|---|---|---|---|---|
| 2005/0080532 | A1* | 4/2005 | Kato | B60T 8/1764 701/41 |
| 2008/0001558 | A1* | 1/2008 | Kikuchi | B60K 6/52 318/5 |
| 2008/0319619 | A1* | 12/2008 | Terayama | B60W 30/188 701/54 |
| 2012/0015772 | A1* | 1/2012 | Kira | B60W 20/13 475/149 |
| 2012/0234133 | A1 | 9/2012 | Ikegami et al. | |
| 2012/0259492 | A1 | 10/2012 | Yamamoto et al. | |
| 2013/0261863 | A1 | 10/2013 | Noguchi | |
| 2014/0081499 | A1* | 3/2014 | Ito | B60K 6/445 701/22 |
| 2014/0191689 | A1 | 7/2014 | Noguchi et al. | |
| 2016/0052383 | A1* | 2/2016 | Caron | B60L 11/005 180/242 |
| 2016/0318420 | A1* | 11/2016 | Hirai | B60L 15/20 |

FOREIGN PATENT DOCUMENTS

| | | | |
|---|---|---|---|
| JP | 2011-79379 | A | 4/2011 |
| JP | 2012-218562 | A | 11/2012 |
| JP | 2012-239264 | A | 12/2012 |
| JP | 2013-212726 | A | 10/2013 |
| WO | 2013/005783 | A1 | 1/2013 |

* cited by examiner

4TH SPEED TRAVELING STATE
(POWER GENERATION BY 5TH SPEED DRIVE GEAR)

5TH SPEED TRAVELING STATE
(POWER GENERATION BY 5TH SPEED DRIVE GEAR)

| PRIORITY DEGREE | CONTENT | REQUIRED POWER |
|---|---|---|
| 1 | LOW VOLTAGE AUXILIARY DEVICE LOAD POWER | Pll |
| 2 | 0[Nm] CONTROL POWER | Pmot0nm |
| 3 | VEHICLE MOVEMENT PERFORMANCE (GENERATION OF LEFT/RIGHT DIFFERENTIAL TORQUE) | PΔtt |
| ⋮ | ⋮ | ⋮ |

RIGHT AND LEFT MOTOR OUTPUT CONTROL FOR VEHICLE

TECHNICAL FIELD

The present invention relates to a vehicle in which at least one of a front wheel pair (left front wheel and right front wheel) and a rear wheel pair (left rear wheel and right rear wheel) is driven by left and right electric motors.

BACKGROUND ART

In FIG. 1 of International Publication No. WO2013/005733 (hereinafter referred to as WO2013/005783A), there is disclosed an all-wheel drive (AWD) capable vehicle equipped with left and right electric motors for driving the rear wheels (left rear wheel and right rear wheel), an electric motor that can also function as a generator connected mechanically to an internal combustion engine that drives the front wheels (left front wheel and right front wheel), an energy storage device connected electrically to the left and right electric motors and to the electric motor that also functions as a generator, and a motor controller that controls the aforementioned three electric motors.

In FIG. 1, etc., of Japanese Laid-Open Patent Publication No. 2011-079379 (hereinafter referred to as JP2011-079379A), there is disclosed a drive device (hybrid drive device) for a hybrid vehicle, which is equipped with a transmission that is switched by a double clutch between an internal combustion engine and an electric motor that also operates as a generator, and in which the internal combustion engine is connected in series with the electric motor.

In Japanese Laid-Open Patent Publication No. 2012-239264 (hereinafter referred to as JP2012-239264A), it is disclosed that a torque is generated in a motor, even in the case that the power supplied to an inverter of the vehicle, to which power from a battery is supplied to the motor through the inverter, is of a zero value (referred to as a 0 [kW] control) (see paragraphs [0092], [0093]). In such a manner, even if the input power to the motor is 0 [kW], in the motor, a negative torque (a resistance force that makes it difficult to rotate the rotor) is generated by an attractive force (iron loss), for example, between a permanent magnet incorporated in the rotor and the core of a stator around which a coil is wound. The negative torque can be determined experimentally or calculated in advance (see paragraph [0093]).

In Japanese Laid-Open Patent Publication No. 2012-218562) hereinafter referred to as JP2012-218562A), it is disclosed that, in order to counterbalance the resistance force caused by the aforementioned negative torque, in a state in which a 0 (zero) torque command is applied to the motor, an electrical motor loss (motor loss) is obtained by detecting an electrical degree, an angular velocity, and the phase currents of two out of three phases, and a control (referred to as a 0 [Nm] control) is performed with the motor in a zero torque state through an inverter so that the obtained motor loss becomes a zero value (see paragraphs [0095], [0096]).

SUMMARY OF INVENTION

Incidentally, when the vehicle is made to turn by the left and right electric motors, for example, assuming as an example a case in which the vehicle is turned to the left, as disclosed in WO2013/005783A, for example, a regenerative torque is generated in the left motor that drives the left rear wheel, which serves as an inner wheel during turning, whereas a running torque is generated in the right motor that drives the right rear wheel, which serves as an outer wheel during turning (see, FIG. 19(*a*) and FIG. 19(*b*) of WO2013/005783A).

At this time, according to WO2013/005733A, a technique is disclosed in which, by carrying out a power priority control (referred to as a zero power control during turning), so that the electric power consumption (running power+loss power) of the right motor and the regenerative power (generated power) of the left motor become equal to each other, the discharge power (outflowing power) in relation to driving of the left and right motors from the energy storage device is made a zero value, and the energy storage device is protected (see paragraph [0124] and FIG. 19(*b*) of WO2013/005783A).

However, in the event that the vehicle is driven to make a turn by such a zero power control during turning (i.e., a control to make the discharge power (outflowing power) in relation to driving of the left and right motors from the energy storage device a zero value), a motive force is generated at all times in the vehicle in the direction of deceleration, and in a situation when acceleration during turning is desired, for example, when traveling at a constant turning speed or when exiting from a curve, drivability in relation to turning of the vehicle is deteriorated.

The present invention has been devised in relation to the techniques and problems mentioned, above, and has the object of providing a vehicle, in which, in the case that even a small amount of residual capacity (SOC: State of Charge) of a discharge power (outflowing power) in relation to driving of the left and right motors from the energy storage device remains, excessive discharging of the energy storage device is protected against, together with improving drivability in relation to turning of the vehicle.

A vehicle according to the present invention comprises a left motor connected mechanically to a left wheel, and a right motor connected mechanically to a right wheel paired with the left wheel, an energy storage device connected electrically to the left motor and the right motor, and a motor control device configured to control a left motive force and a right motive force, which are motive forces generated by the left motor and the right motor. The motor control device is configured to control the left motive force and the right motive force of the left motor and the right motor so as not to exceed a maximum value of a difference between the left motive force and the right motive force, which is determined on a basis of a temperature of the energy storage device or a maximum output power of the energy storage device.

According to the present invention, when the output power is limited, for example, by the energy storage device being at a low temperature or the like, by controlling the difference (difference or ratio) between the left motive force and the right motive force on the basis of such a limitation, damage to the energy storage device due to excessive discharging or the like can be prevented, while the turning performance of the vehicle can be ensured by carrying out a turning directional control.

In this case, the motor control device may determine the maximum value of the difference based on a consumable power that is capable of being consumed by the left motor and the right motor, which is determined on a basis of the temperature of the energy storage device or the maximum output power of the energy storage device, and a correspondence relationship between the difference between the left motive force and the right motive force and a power loss at a time that the difference is generated. In this manner, it is possible to more reliably protect the maximum output power of the energy storage device.

Further, when the left motor and the right motor are controlled so as not to exceed the maximum value of the difference, the motor control device preferably controls the left motor and the right motor so that a sum total of the left motive force and the right motive force becomes substantially zero.

By controlling the left and right sum of the left motive force and the right motive force so as to become substantially zero, the power loss, which may occur in accordance with the left and right difference, increases, whereby it is possible for the power consumed by the sum total of the left and right motors to be reduced, and for the maximum value of the left and right difference (power difference) to be increased in value.

Furthermore, the vehicle comprises an internal combustion engine and a generator configured to be driven by the internal combustion engine and connected electrically to the energy storage device, and at a time that the vehicle is currently traveling, and occurrence of a period in which the generator cannot generate electricity is predicted or detected, then within the period in which electricity cannot be generated, the motor control device is configured to control the left motive force and the right motive force of the left motor and the right motor so as not to exceed the maximum value of the difference between the left motive force and the right motive force, which is determined on a basis of the temperature of the energy storage device or the maximum output power of the energy storage device. In accordance therewith, even in a period in which the generator cannot generate electricity, damage to the energy storage device can be prevented, and by carrying out the turning control of the vehicle, the turning performance of the vehicle can be ensured.

According to the present invention, even when the output power is narrowed by the energy storage device being at a low temperature or the like, it is possible for a maximum differential torque to be generated, whereby under various conditions, the turning performance of the vehicle can be maintained, and as a result, a deterioration in drivability under a low temperature condition or the like can be suppressed.

BRIEF DESCRIPTION OF DRAWINGS

FIG. 12 is an explanatory diagram showing a power-usage priority table;

DESCRIPTION OF EMBODIMENTS

Figure 1:
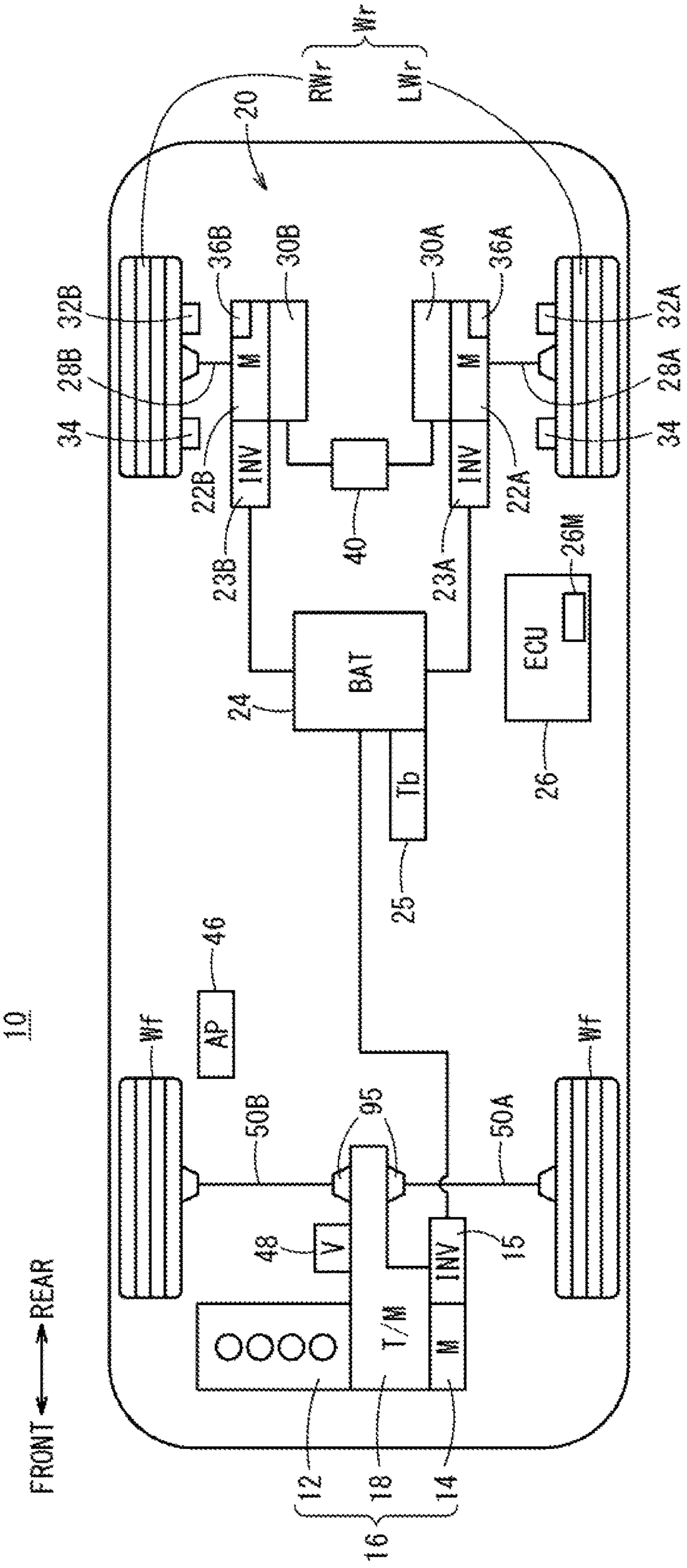
FIG. 1 is a block diagram showing in outline the configuration of a vehicle according to an embodiment of the present invention.

FIG. 1 is a block diagram showing in outline the configuration of a vehicle 10 according to an embodiment of the present invention.

The vehicle 10 is a hybrid vehicle, which includes on a front part of the vehicle a drive device 16 (second drive device, hereinafter referred to as a front wheel drive device) in which a motor (M) 14 is connected in series through a transmission (T/M) 18 to an internal combustion engine 12. Motive power from the internal combustion engine 12 and the motor 14 is transmitted to the front wheels Wf through the transmission 18, whereas motive power of a drive device 20 (first drive device, hereinafter referred to as a rear wheel drive device) disposed on a rear part of the vehicle separately from the front wheel drive device 16 is transmitted to the rear wheels Wr (RWr, LMr).

The motor 14 of the front wheel drive device 16 and left and right motors (M) 22A, 22B (first and second motors) of the rear wheel drive device 20 are each connected electrically to a battery (BAT) 24 through inverters (INV) 15, 23A, 23B that serve as DC/AC converters in which switching elements are connected in a three-phase full bridge design, and are capable of being supplied with power from the battery 24, and of carrying out energy regeneration to the battery 24. The battery 24 is an energy storage device (energy storage), which in addition to a secondary battery such as a nickel hydride battery, a lithium ion battery or the like, can alternatively be a capacitor. According to the present embodiment, a lithium ion secondary battery is employed. Further, a battery temperature detector 25 that detects a battery temperature Tb is provided on the battery 24.

The vehicle 10 is equipped with an accelerator operation amount sensor 46 that detects an operated amount (accelerator opening, accelerator operation amount) AP of a non-illustrated accelerator pedal or an accelerator operation amount (accelerator opening, acceleration operation amount) AP of a non-illustrated cruise control unit, and a vehicle velocity sensor 48 that detects a vehicle velocity V.

Respective constituent components of the vehicle 10 are controlled by an ECU (Electronic Control Unit) 26 that serves as a control device. As is well known, the ECU 26 contains a microcomputer (a CPU, a storage device (a memory such as a ROM and a RAM, etc., storage unit, storage means) 26M, a timing device (timer, timer unit, timer means), and an input/output interface, etc.), which is operated as various function means (various function units) that implement various operations by the CPU executing programs based on information from various sensors (various detectors). The ECU 26 may be a single unit or may make use of a plurality of units. In the present embodiment, to avoid complexity and facilitate understanding, a description is made of a single ECU 26.

Under the control of the ECU 26, the vehicle 10 is capable of being operated in a rear wheel drive traveling mode in which only the rear wheels Wr are driven by the rear wheel drive device 20, a front wheel drive traveling mode in which only the front wheels Wr are driven by the front wheel drive device 16, and an all-wheel drive traveling mode (AWD, four wheel drive (4WD)) in which the rear wheels Wr are driven by the rear wheel drive device 20 and the front wheels Wf are driven by the front wheel drive device 16 in combination.

In the rear wheel drive traveling mode, the rear wheels Wr are driven by the left and/or the right motors 22A, 22B, and in the front wheel drive traveling mode, the front wheels Wf are driven by the internal combustion engine 12 and/or the motor 14.

Description of Rear Wheel Drive Device 20

The rear wheel drive device 20 includes axles 28A, 28B. The axles 28A, 28B are axles of the left and right rear wheel Wr side of the vehicle 10, which are arranged on the same axis in a vehicle widthwise direction. The detailed structure of the rear wheel drive device 20 including the left and right motors 22A, 22B, for example, is disclosed in WO2013/005783A, and therefore, to avoid complexity and facilitate understanding, the rear wheel drive device 20 will be described only insofar as necessary to enable understanding of the invention.

In the rear wheel drive device 20, the left and right motors 22A, 22B for driving the axles, and left and right speed reducers 30A, 30B that decelerate the drive rotation of the left and right motors 22A, 22B are arranged coaxialiy with the axles 28A, 28B. Hydraulic brakes, which are driven by an electrical oil pump 40, and one-way clutches, which transmit to the axles 28A, 28B motive power (a forward drive force) in the forward direction of the left and right motors 22A, 22B, are incorporated in the speed reducers 30A, 30B.

The left motor 22A functions as a left motor that drives the left rear wheel LWr, and the right motor 22B functions as a right motor that drives the right rear wheel RWr.

Wheel speed sensors 32A, 32B, which detect the rotational speed of the left rear wheel LWr and the right rear wheel RWr, are provided in the rear wheels Wr, together with slip acquisition devices 34, which are capable of acquiring information concerning the occurrence of an acceleration slip or a deceleration slip (hereinafter also referred to simply as "slip") above a predetermined amount of the left rear wheel LWr and the right rear wheel RWr.

Resolvers 36A, 36B, which are rotational speed detectors that detect the rotational speed, etc., of the left and right motors 22A, 22B, are provided in the left and right motors 22A, 22B.

Aside from the rotational speeds of the left and right rear wheels LWr, RWr acquired from the wheel speed sensors 32A, 32B, the rotational speeds of the left and right motors 22A, 22B acquired from the resolvers 36A, 36B, the vehicle velocity V acquired front the vehicle velocity sensor 38, and the accelerator opening AP obtained from the accelerator operation amount sensor 46, there also are input to the ECU 26 a steering angle, a shift position, the SOC which is the charge state of the battery 24 (also referred to as a storage amount or a residual capacity, normally expressed as a percentage % display of a full charge capacity of 100%), and various oil temperatures, etc. On the other hand, from the ECU 26, there are output signals for controlling the front wheel drive device 16 including the internal combustion engine 12 and the motor 14, and signals, etc., for controlling the rear wheel drive device 20 including the left and right motors 22A, 22B.

Description of Front Wheel Drive Device 16

Figure 2:
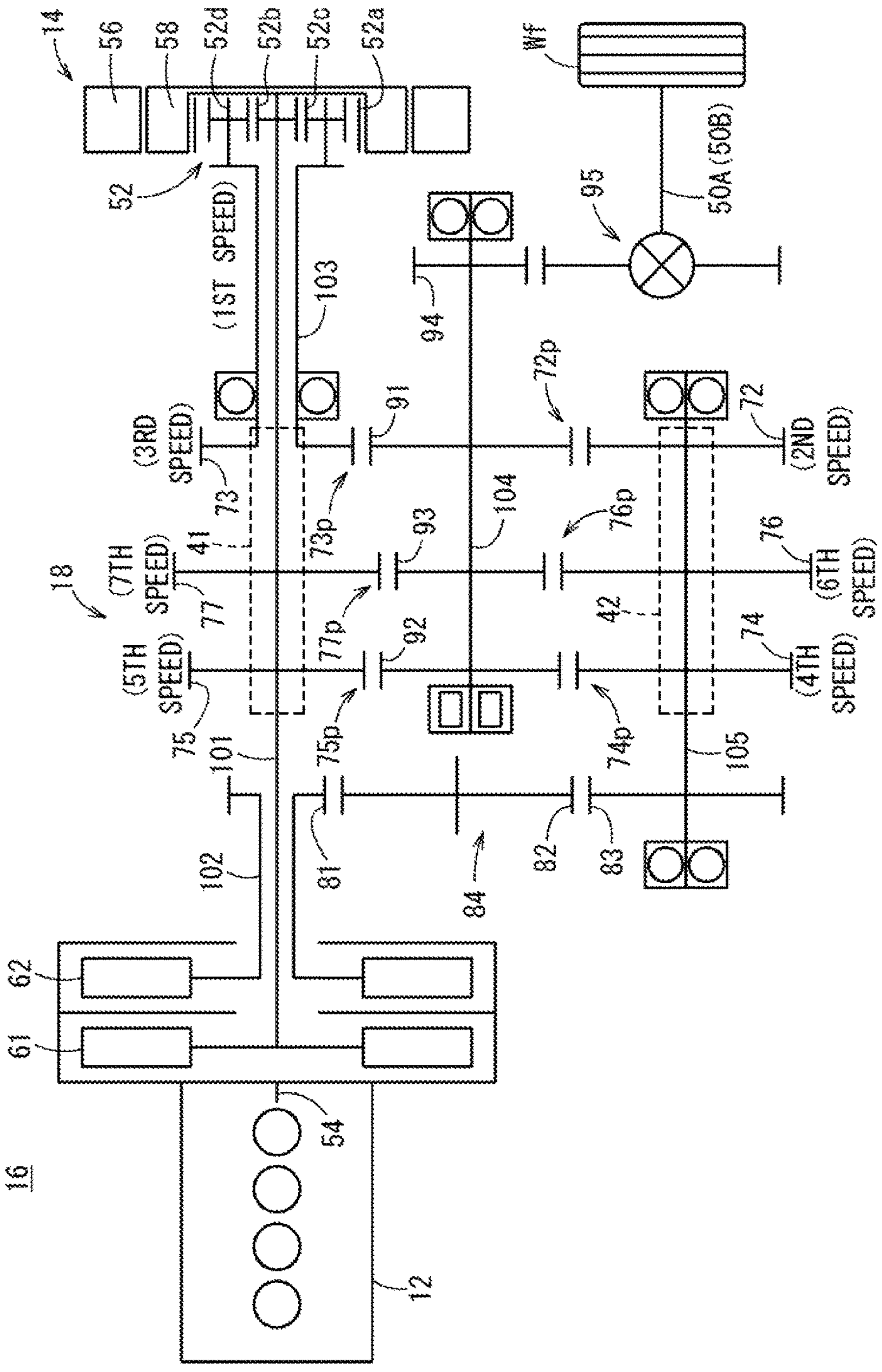
FIG. 2 is an outline schematic diagram of a front wheel drive device in the vehicle of FIG. 1.

FIG. 2 is an outline schematic diagram of the front wheel drive device 16. The detailed structure of the front wheel drive device 16, for example, is disclosed in FIGS. 1 and 14, etc., of JP2011-079379A, and therefore, to avoid complexity and facilitate understanding, the front wheel drive device 16 will be described only insofar as necessary to enable understanding of the invention.

The front wheel drive device 16 is equipped with the internal combustion engine 12 as a drive source, the motor 14, which functions as a drive source, an auxiliary drive source, or a generator, the transmission 18 for transmitting power from the drive source or the auxiliary drive source to the front wheels Wf, and a planetary gear mechanism 52 that serves as a differential reduction gear constituting a portion of the transmission 18.

The motor 14 is a three-phase brushless synchronous motor including a stator 56 in which a coil is wound around a stator core, and a rotor 58 in which permanent magnets are incorporated that are arranged in facing relation to the stator 56.

The planetary gear mechanism 52 includes a ring gear 52*a*, a planetary gear 52*c*, a planetary carrier 52*d*, and a sun gear 52*b* that is connected to the rotor 58.

The transmission 18 is a so-called double clutch type of transmission, which is equipped with a first clutch 61 (first engaging/disengaging means) and a second clutch 62 (second engaging/disengaging means) disposed on a crankshaft 54 of the internal combustion engine 12, plural transmission gear groups including the planetary gear mechanism 52, a first shift actuator (first transmission means, first transmission shifter-synchronizer) 41, and a second shift actuator (second transmission means, second transmission shifter-synchronizer) 42 for switching the transmission gear groups (switching gears).

The transmission 18 is equipped with a first main shaft (also referred to as a first first main shaft) 101 arranged coaxially with the crankshaft 54 of the internal combustion engine 12 and by which power from the internal combustion engine 12 is transmitted directly through the first clutch 61, and a hollow connecting shaft 103 (also referred to as a second first main shaft) 103 by which power from the internal combustion engine 12 is transmitted through the first main shaft 101, the sun gear 52*b*, the planetary gear 52*c*, and the planetary carrier 52*d*, together with a hollow second main shaft (also referred to as a first second main shaft) 102 by which power from the internal combustion engine 12 is transmitted through the second clutch 62, an idle gear train

84 (made up from an idle drive gear 81, a first idle driven gear 82, and a second idle driven gear 83) connected to the second main shaft 102, and a second main shaft (also referred to as a second second main shaft, or an intermediate shaft) 105 as a rotary shaft of the second idle driven gear 83. Furthermore, the transmission 18 is equipped with a counter shaft (also referred to as an output shaft) 104 arranged in parallel with the first main shafts 101, 103 and the second main shafts 102, 105, and which drives the front wheels Wf through a differential gear mechanism 95 and via axles 50A (50B).

Furthermore, in the transmission 18, on the first and second first main shafts 101, 103 (first input shafts), which belong to one (odd-number stage transmission shaft) of two transmission shaft groups, there is disposed an odd-numbered gear group (first gear group) constituted from a fifth speed drive gear 75, a seventh speed drive gear 77, and a third speed drive gear 73, whereas on the first and second second main shafts 102, 105 (second input shafts), which belong to the other (even-number stage transmission shaft) of the two transmission shaft groups, there is disposed an even-numbered gear group (second gear group) constituted from a second speed drive gear 72, a fourth speed drive gear 74, and a sixth speed drive gear 76.

In the first shift actuator 41, the fifth speed drive gear 75, the seventh speed drive gear 77, and the third speed drive gear 73, which are not fixed to the first main shafts 101, 103 (although in FIG. 2, for the sake of convenience, they are shown as being fixed thereto), are selectively connected to and released from the first main shafts 101, 103.

In the second shift actuator 42, the fourth speed drive gear 74, the sixth speed drive gear 76, and the second speed drive gear 72, which are not fixed to the second main shaft 105 (although in FIG. 2, for the sake of convenience, they are shown as being fixed thereto), are selectively connected to and released from the second main shaft 105.

A first shared driven gear 91 disposed on the counter shaft 104 is enmeshed with the third speed drive gear 73 and constitutes a third speed gear pair 73*p* together with the third speed drive gear 73, while on the other hand, is also enmeshed with the second speed drive gear 72 and constitutes a second speed gear pair 72*p* together with the second speed drive gear 72.

A second shared driven gear 92 disposed on the counter shaft 104 is enmeshed with the fifth speed drive gear 75 and constitutes a fifth speed gear pair 75*p* together with the fifth speed drive gear 75, while on the other hand, is also enmeshed with the fourth speed drive gear 74 and constitutes a fourth speed gear pair 74*p* together with the fourth speed drive gear 74.

A third shared driven gear 93 disposed on the counter shaft 104 is enmeshed with the seventh speed drive gear 77 and constitutes a seventh speed gear pair 77*p* together with the seventh speed drive gear 77, while on the other hand, is also enmeshed with the sixth speed drive gear 76 and constitutes a sixth speed gear pair 76*p* together with the sixth speed drive gear 76.

The internal combustion engine 12 is connected to the first main shaft 101, which is an odd-number stage transmission shaft of the transmission 18 when the ECU 26 engages the first clutch 61, together with being connected to the rotor 58 of the motor 14 through the first main shaft 101, and becomes capable of driving the motor 14 as a generator.

Further, when the motor 14 is driven as a generator, using any one of the third, fifth, or seventh speed gears (third speed drive gear 73, fifth speed drive gear 75, seventh speed drive gear 77), the internal combustion engine 12 carries out torque transmission with respect to the front wheels Wf through the counter shaft 104.

Furthermore, the internal combustion engine 12 is connected to the first and second second main shafts 102, 105, which, form the even-number stage transmission shaft of the transmission 18 when the ECU 26 engages the second clutch 62, and using any one of the second, fourth, or sixth speed gears (second speed drive gear 72, fourth speed drive gear 74, sixth speed drive gear 76), the internal combustion engine 12 carries out torque transmission with respect to the front wheels Wf through the counter shaft 104.

On the other hand, when the ECU 26 has released the first and second clutches 61, 62 and the motor 14 is operated as an electric motor, the rotary drive force from the rotor 58 is connected through the planetary gear mechanism 52 to the first first main shaft 101, which is the odd-number stage transmission shaft of the transmission 18, and using any one of the third, fifth, or seventh speed gears (third speed drive gear 73, fifth speed drive gear 75, seventh speed drive gear 77), torque transmission can be carried out with respect to the front wheels Wf through the counter shaft 104. Moreover, when the motor 14 carries out torque transmission to the front wheels Wf, and at a time that power regeneration from the front wheels Wf is performed, both of the first and second clutches 61, 62 are released, whereby the mechanical connection with the internal combustion engine 12 is cut off to thereby improve efficiency.

A final gear 94 disposed on the counter shaft 104 is used commonly by the odd-number stage third speed, fifth speed, and seventh speed drive gears 73, 75, 77 and the even-number stage second speed, fourth speed, and sixth speed drive gears 72, 74, 76.

According to the present embodiment, in order to avoid complexity, odd-number stage shifting is controlled by the first shift actuator 41, including the first speed shift control that operates the planetary gear mechanism 52.

The rotor 58 of the motor 14 is connected directly to the first speed sun gear 52*b*, and an assist with respect to the power from the internal combustion engine 12 is carried out from the side of the odd-number stage. More specifically, when the even number stage is used (when the second clutch 62 is engaged), an assist (power transmission is enabled in which the first speed drive gear (the planetary gear mechanism 52 and the third speed drive gear 73), the fifth speed drive gear 75, and the seventh speed drive gear 77 are used since the first clutch 61 of the odd-number stage side is released.

During times of power regeneration or motor traveling (EV traveling), although the first and second clutches 61, 62 are interrupted, and the internal combustion engine 12 is completely disconnected, power transmission from the motor 14 is carried out only from the odd-number stage gear, and therefore regeneration of power and motor traveling is carried out only by the odd-number stage gear. Start of movement, as a rule, is enabled only by the odd-number stage gear (normally, start of movement is initiated with the first speed drive gear).

With the double clutch transmission 18, which is constituted in the foregoing manner, in a so-called pre-shift state, i.e., a state in which a next lower speed stage side or a next higher speed stage side transmission gear is set in standby beforehand by the first and second shift actuators 41, 42, high speed shifting can be realized by alternately connecting (connecting/disconnecting, fastening or releasing) the first and second clutches 61, 62.

Motor Traction Control

The ECU 26 controls the front wheel drive device 16 and the rear wheel drive device 20 in accordance with each of respective vehicle states. In particular, with respect to the rear wheel drive device 20, it may also function as a motor controller including a motor traction control system (M-TCS) that carries out a motor traction control for controlling slippage of the rear wheels Wr on the basis of the wheel rotational speed of the rear wheels Wr or the motor rotational speed of the left and right motors 22A, 22B. When the motor traction control is implemented, the torques generated by the left and right motors 22A, 22B are controlled, and the rotating states of the left and right rear wheels LWr, RWr are controlled.

Description of Torque Priority Control and Power Priority Control During Turning With the present invention, at a time that the vehicle 10 is traveling while making a turn, the invention has the object of protecting against excessive discharge of the battery 24, together with improving drivability in relation to turning performance of the vehicle 10. Therefore, a description will be given concerning a torque priority control and a power priority control implemented at a time of turning. Below, a left turn will be described as an example.

Concerning the torque priority control and the power priority control during turning, details thereof are disclosed in WO2013/005783A, and therefore this content will be described only insofar as necessary to enable understanding of the invention.

Figure 3A:
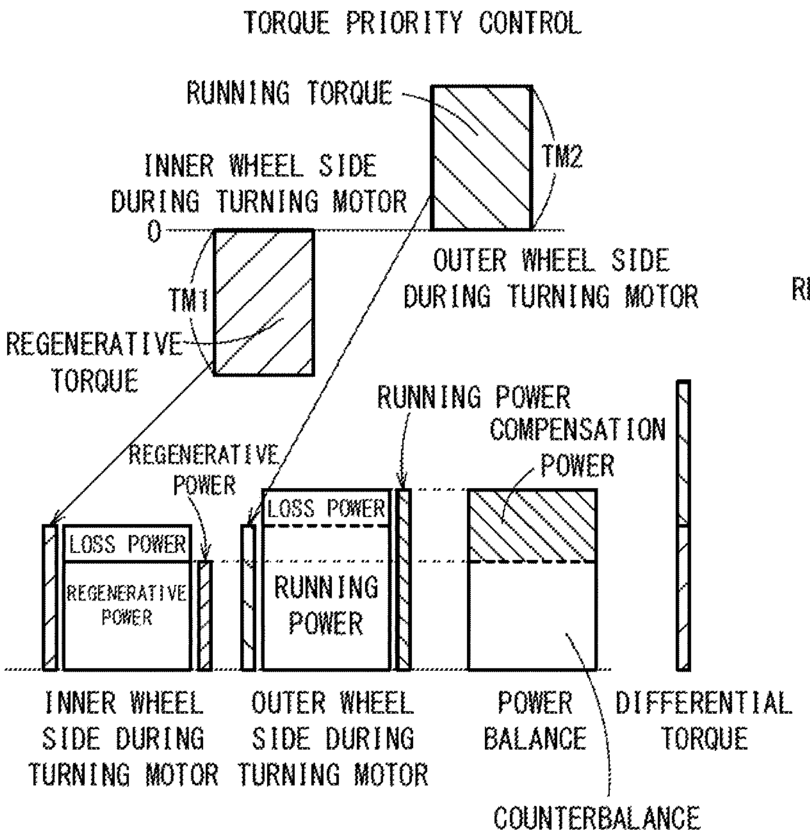
FIG. 3A is an explanatory diagram of a torque priority control.
Figure 3B:
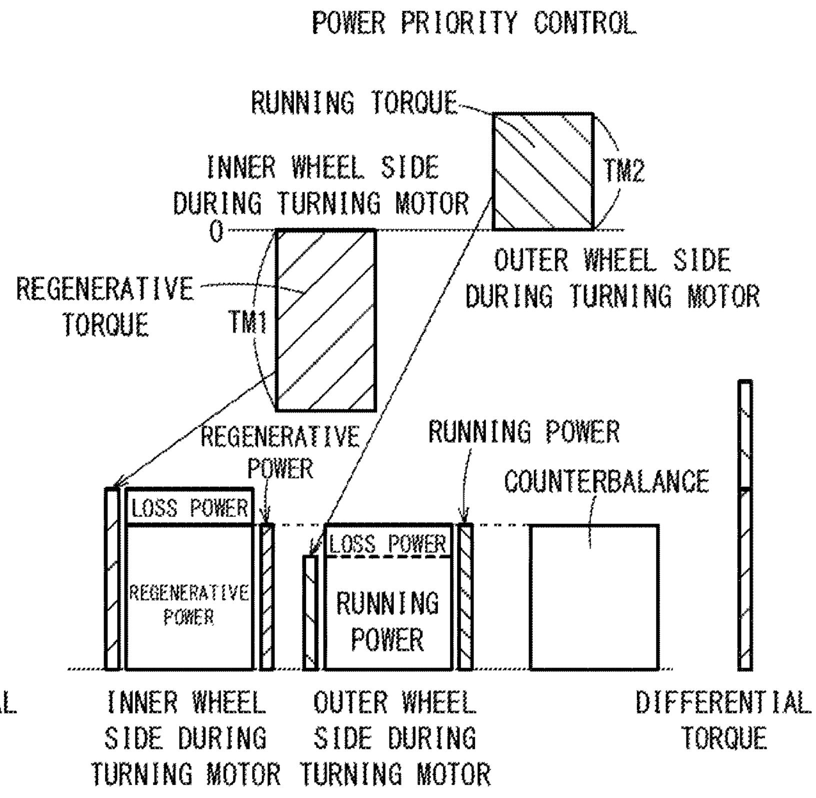
FIG. 3B is an explanatory diagram of a power priority control.

FIG. 3A is an explanatory diagram of the torque priority control, and FIG. 3B is an explanatory diagram of the power priority control.

In the case that the vehicle 10 is traveling while executing a turn, a difference occurs in the rotations of the left motor (first motor) 22A and the right motor (second motor) 22B, and the left rear wheel LWr connected to the left motor 22A serves as an inner wheel during turning, whereas the right rear wheel RWr connected to the right motor 22B serves as an outer wheel during turning. In either of these controls, a counterclockwise yaw moment is generated.

The torque priority control shown in FIG. 3A will be described by the following equations.

The following equations (1) and (2) are indicated, in which a target torque of the left rear wheel LWr is represented by TT1, a target torque of the right rear wheel RWr is represented by TT2, a target left and right sum torque (hereinafter referred to simply as a left and right sum torque) is represented by TRT, and a target left and right differential torque (hereinafter referred to simply as a left and right differential torque) is represented by ΔTT.

$$\mathrm{TT1}+\mathrm{TT2}=TRT \quad (1)$$

$$\mathrm{TT1}-\mathrm{TT2}=\Delta\mathrm{TT} \quad (2)$$

In the example of FIG. 3A and the example of FIG. 3B, a target torque TM1 of the left motor 22A connected to the left rear wheel LWr, and which is directly proportional to the target torque TT1 of the left rear wheel LWr, is a regenerative torque and is of a negative value, whereas a target torque TM2 of the right motor 22B connected to the right rear wheel RWr, and which is directly proportional to the target torque TT2 of the right rear wheel RWr, is a running torque and is of a positive value.

As is well known, the target left and right differential torque ΔTT is derived by the following equation (3), in which the target yaw moment (clockwise is positive) is represented by Ym, the wheel radius is represented by r, and the tread width (left and right rear wheel LWr, RWr interval width) is represented by Dt.

$$\Delta\mathrm{TT}=2\cdot r\cdot \mathrm{Ym}/Dt \quad (3)$$

The target left and right sum torque TRT is a set-value on the basis of the accelerator operation amount AP and the vehicle velocity V, etc., and the target torque TT1 of the left rear wheel LWr and the target torque TT2 of the right rear wheel RWr can be set (calculated) from equation (1), and equation (2) in which the value for ΔTT of equation (3) has been substituted.

The target torques TM1, TM2 of the left and right motors 22A, 22B are derived from the following equation (4) and equation (5). In equations (4) and (5), the term "Ratio" is indicative of a non-illustrated gear ratio.

$$TM1=(1/\mathrm{Ratio})\cdot \mathrm{TT1} \quad (4)$$

$$TM2=(1/\mathrm{Ratio})\cdot \mathrm{TT2} \quad (5)$$

With the torque priority control, a torque request in forward and rearward directions and a torque request in a turning direction can be satisfied based on the target left and right sum torque TRT and the target left and right differential torque ΔTT, wherein the traveling performance of the vehicle 10 is emphasized.

In the torque priority control shown in FIG. 3A, the regenerative torque TM1 of the left motor 22A generates a regenerative power and a loss power, and the running power of the right motor 22B generates a running power that generates the running torque TM2 and the loss power. As a power balance, although the regenerative power portion compensates a portion of the running power that is converted into the running torque TM2, the loss power and the remaining portion of the running power that is converted into the running torque TM2 become a compensated power, which is compensated by the discharge power Pd from the battery 24, etc.

In FIG. 3A, although a torque priority control has been described in which the left motor 22A serves as a regenerative torque TM1 and the right motor 22B serves as a running torque TM2, the torque priority control also is applicable to a case in which both the left and right motors 22A, 22B are running torques, and to a case in which both are regenerative torques. However, in the case that both of them are running torques, the discharge power Pd of the battery 24 is increased by such an amount.

Next, the power priority control shown in FIG. 3B will be described by way of equations.

In the power priority control, a sum of the power-generated by the left motor 22A and the power consumed by the right motor 22B is given priority, and the left and right motors 22A, 22B are controlled on the basis of the sum power.

The power priority control, for example, is carried out in the case that the temperature of the battery 24 is a so-called time of low temperature, when it is less than or equal to a predetermined temperature, for example, less than or equal to a freezing point temperature, in the case that the SOC of the battery 24 is low, in the case that an electricity-generating capacity (power generation) of the motor 14 of the front wheel drive device 16 is insufficient, or in the event of a power running state, in the case there is a hindrance to supply/reception of normal power, such as when there is a failure of the battery 24 or the motor 14 or the like.

With the power priority control, in addition to the above-described equations (1) and (2), the following equation (6) also is referred to.

$$P1+P2=0 \quad (6)$$

where P1 is the electric power that is consumed or generated by the left motor 22A, and P2 is the electric power that is consumed or generated by the right motor 22B.

Since losses are generated in supply and reception of power, the regenerative power and the running power can be represented respectively by the following equations (7) and (8).

$$\text{Regenerative power}=\text{Mechanical Input}\ (1-\text{Regenerative Loss Ratio}) \quad (7)$$

$$\text{Running Power}=\text{Mechanical Input}\ (1+\text{Running Loss Ratio}) \quad (8)$$

On the basis of the above equations (7) and (8), the electric powers (drive forces) P1, P2 of the left and right motors 22A, 22B are represented by the following equations (9) and (10), in which the angular velocity of the rotor of the left motor 22A is represented by ω1, the angular velocity of the rotor of the right motor 22B is represented by ω2, the regenerative loss ratio is represented by Lr1, and the running loss ratio is represented by Lr2, and additionally, as shown in FIG. 3B, the left motor 22A functions as a regenerative drive, and the right motor 22B functions as a power running drive.

$$P1=\omega1\cdot TM1(1-\mathrm{Lr1}) \quad (9)$$

$$P2=\omega2\cdot TM2(1+\mathrm{Lr2}) \quad (10)$$

where $\omega=2\cdot\pi\cdot n/60$ (n is the rotational speed of the respective motors).

When the target torques TM1, TM2 are eliminated from the above equations (4) through (6), (9), and (10), the following equation (11) is derived.

$$\mathrm{TT2}=-(\omega1/\omega2)\cdot[(1-\mathrm{Lr1})/(1+\mathrm{Lr2})]\cdot\mathrm{TT1} \quad (11)$$

When equation (11) is considered, because the angular velocity ω1 of the left motor 22A on the inner wheel side is less than the angular velocity ω2 of the right motor 22B on the outer wheel side ($\omega1<\omega2$), and further since $(1-\mathrm{Lr1})<(1+\mathrm{Lr2})$, it is always the case that $|\mathrm{TT2}|<|\mathrm{TT1}|$ and $\mathrm{TT1}+\mathrm{TT2}<0$.

Consequently, in the power priority control, the target left and right sum torque of the left and right rear wheels LWr, RWr (i.e., the sum of the target torque TT1 of the left rear wheel LWr and the target torque TT2 of the right rear wheel RWr) TRT, is always minus, or stated otherwise, the regenerative torque is greater than the running torque.

In general, the relationship between the wheel torque T [Nm] and the wheel drive force F [N], as is well known, is a proportional relationship derived by the following equation (12), where the radius of the rear wheels Wr is represented by r.

$$F=T/r \quad (12)$$

As shown in FIG. 3B, the regenerative torque TM1 of the left motor 22A generates a corresponding regenerative power and a loss power, and the running power of the right motor 22B generates a running power, which in turn generates the running torque TM2, and a loss power. As a power balance, in accordance with the regenerative power portion, since all of the running power that is converted into the running torque TM2 and all of the loss power is covered, the regenerative power is counterbalanced, and the power balance becomes a zero power.

In the power priority control (the term "priority" implies a priority with respect to the torque priority control), as shown in the following equation (6)', the sum electric power (sum drive force) P1+P2 is non-zero, and may be set to a predetermined target power α (α≠0). However, the predetermined target power α is set to a value that is less than a predetermined limit target power γLmt corresponding to the state of the battery 24 and the power generating state of the motor 14 (α<αLmt).

$$P1+P2=\alpha \quad (6)'$$

The controls are implemented such that, with the torque priority control, a priority order [ΔTT→TRT→(P1+P2)] is assigned in order of the target left and right differential torque ΔTT of equation (2), the target left and right sum torque TRT of equation (1), and the sum electric power (sum drive force) P1+P2 of equation (6) or (6)'. With the power priority control, a priority order [(P1+P2)→ΔTT→TRT] is assigned in order of the sum electric power (sum drive force) P1+P2 of equation (6) or (6)', the target left and right differential torque ΔTT of equation (2), and the target left and right sum torque TRT of equation (1).

Description of State in which Power Generating Operation of Motor 14 Driven as a Generator is not Performed Concerning the torque priority control in a state in which the power generating operation of the motor 14 which is driven as a generator is not carried out, there is a need for the compensation power shown in FIG. 3A to be compensated by the discharge power Pd of the battery 24, and a discharge request with respect to the battery 24 becomes severe. An exemplary situation in which the power generating operation of the motor 14, which is driven as a generator, is not carried out will be described with reference to the schematic block diagram of FIG. 4, which shows an example of power distribution in the vehicle 10, and the time chart of FIG. 5.

Figure 4:
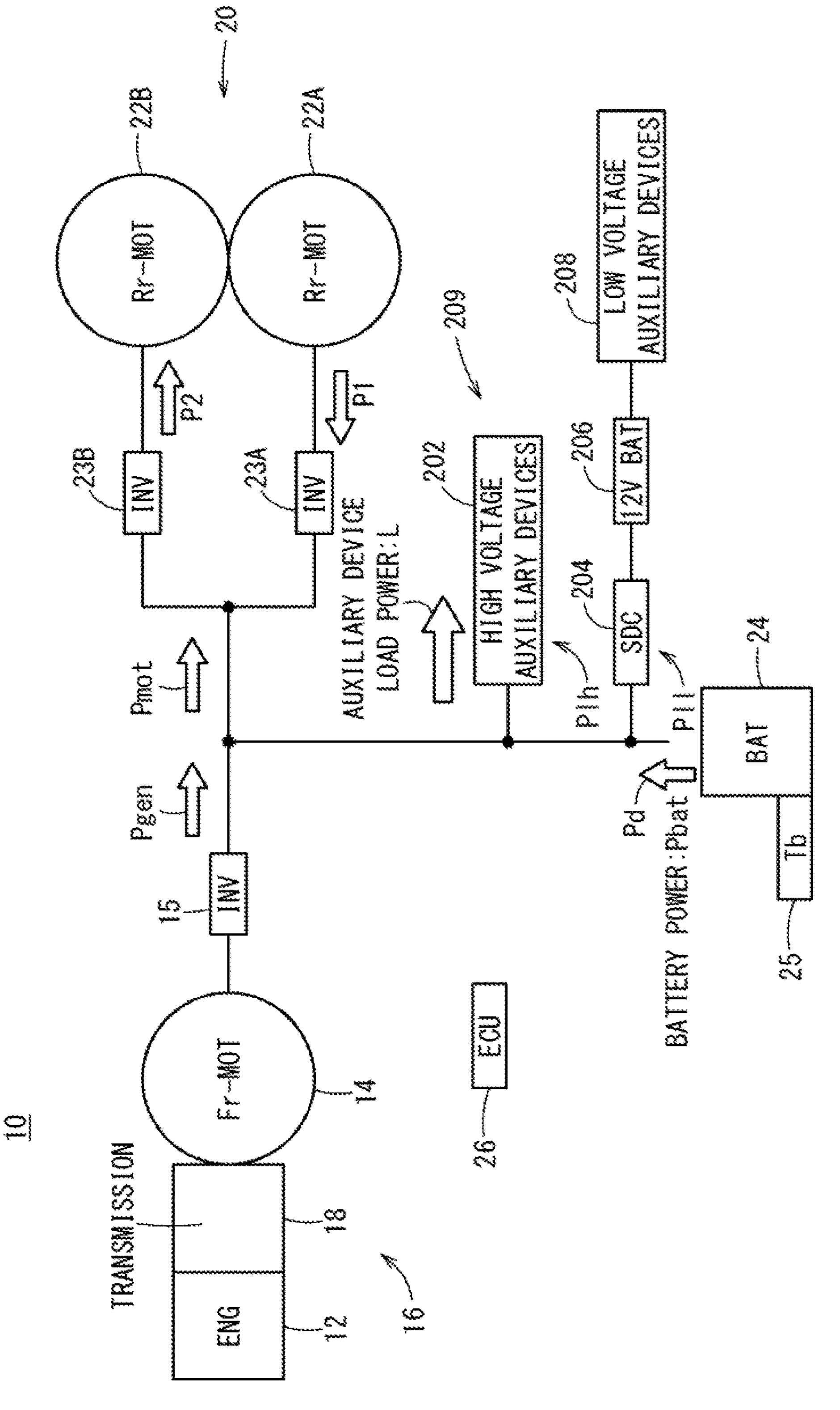
FIG. 4 is a schematic block diagram for describing an example of power distribution of the vehicle.

As shown in FIG. 4, the motor 14 (referred to as Fr-MOT (front wheel drive motor) in FIG. 4, since it is a motor on the side of the front wheels Wf) is connected through the aforementioned double clutch transmission 18 with respect to the internal combustion engine 12 (referred to as ENG) of the vehicle 10, and the generated power Pgen at a time (before time t1 in FIG. 5) that the motor 14 is operated as a generator is indicated by Pgen=X [kW].

Figure 5:
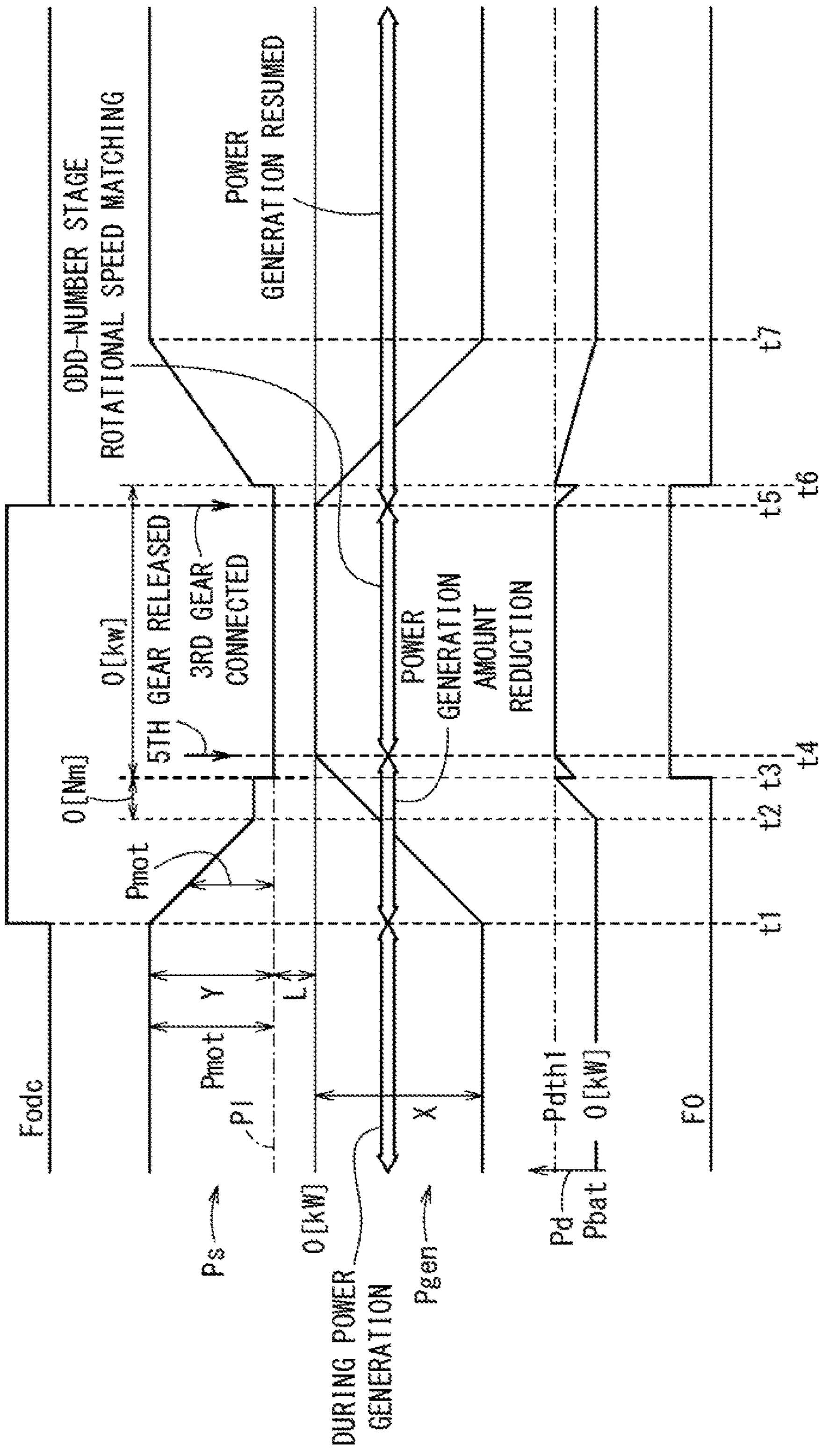
FIG. 5 is a time chart for providing a description of a state of non-power generation when an odd-number stage gear is changed.

The left and right total power Pmot of the electric power consumption P1 [kW] of the left motor 22A that drives the left rear wheel LWr (referred to as Rr-MOT (rear wheel drive motor) in FIG. 4, since it is a motor on the side of the rear wheels Wr) and the electric power consumption P2 [kW] of the right motor 22B (Rr-MOT) that drives the right rear wheel RWr is defined by Pmot=Y [kW] (also referred to as the Rr-MOT output power) up to a certain time (time t1 in FIG. 5).

The value of an auxiliary device load power Pl [kW] of auxiliary devices 209 is a constant value defined by the auxiliary device, load power Pl=L [kW]. The auxiliary devices 209 are made up from high voltage auxiliary devices 202 such as an air conditioner or the like connected to the battery 24, and low voltage auxiliary devices 208 and a 12V battery 206, which are connected through a step down converter 204.

The high voltage auxiliary devices 202 are loads related to comfort of the vehicle 10, and the low voltage auxiliary devices 208 are essential loads for the purpose of allowing the vehicle 10 including the ECU 26, etc., to operate. Therefore, concerning the priority of power usage, it should be borne in mind that loads to which power is supplied from the SDC (step down converter) 204 are higher in priority.

More specifically, although the auxiliary device load power Pl is divided into a high voltage auxiliary device load power Plh and a low voltage auxiliary device load power Pll, the priority with which the battery power Pbat (discharge power Pd) of the battery 24 is used is higher for the low voltage auxiliary device load power Pll than for the high voltage auxiliary device load power Plh.

As a steady state, the load electric power consumption Ps (Ps=Pmot+P1), which is a combined power of the left and right total power Pmot=Y of the left and right motors 22A, 22B and the auxiliary device load power Pl=L [kW], as shown in the following equations (13) through (15), is of a value that is equivalent to the generated power Pgen=X [kW] of the motor 14 which is operated as a generator.

$$\text{Steady State: } Pgen=Ps=Pmot+Pl \quad (13)$$

$$\text{Steady State: } X=Y+L \quad (14)$$

$$\text{Steady State: } Pbat=Pd=0 \quad (15)$$

In a steady state control by the ECU 26 at time t1 and before (see FIG. 5), for example, the gear stage of the transmission 18 is in fourth gear while the vehicle is traveling at a constant speed on a flat road.

As discussed above, during traveling at a constant speed under operation of the steady state control, the left and right total power Pmot=Y for traction of the left and right motors 22A, 22B in which a drive force (torque) is generated, and the auxiliary device load power Pl=L of the auxiliary devices 209 are covered by the generated power Pgen=X of the motor 14, which is being driven as a generator. Therefore, the battery power Pbat of the battery 24 becomes 0 [kW].

Figure 6:
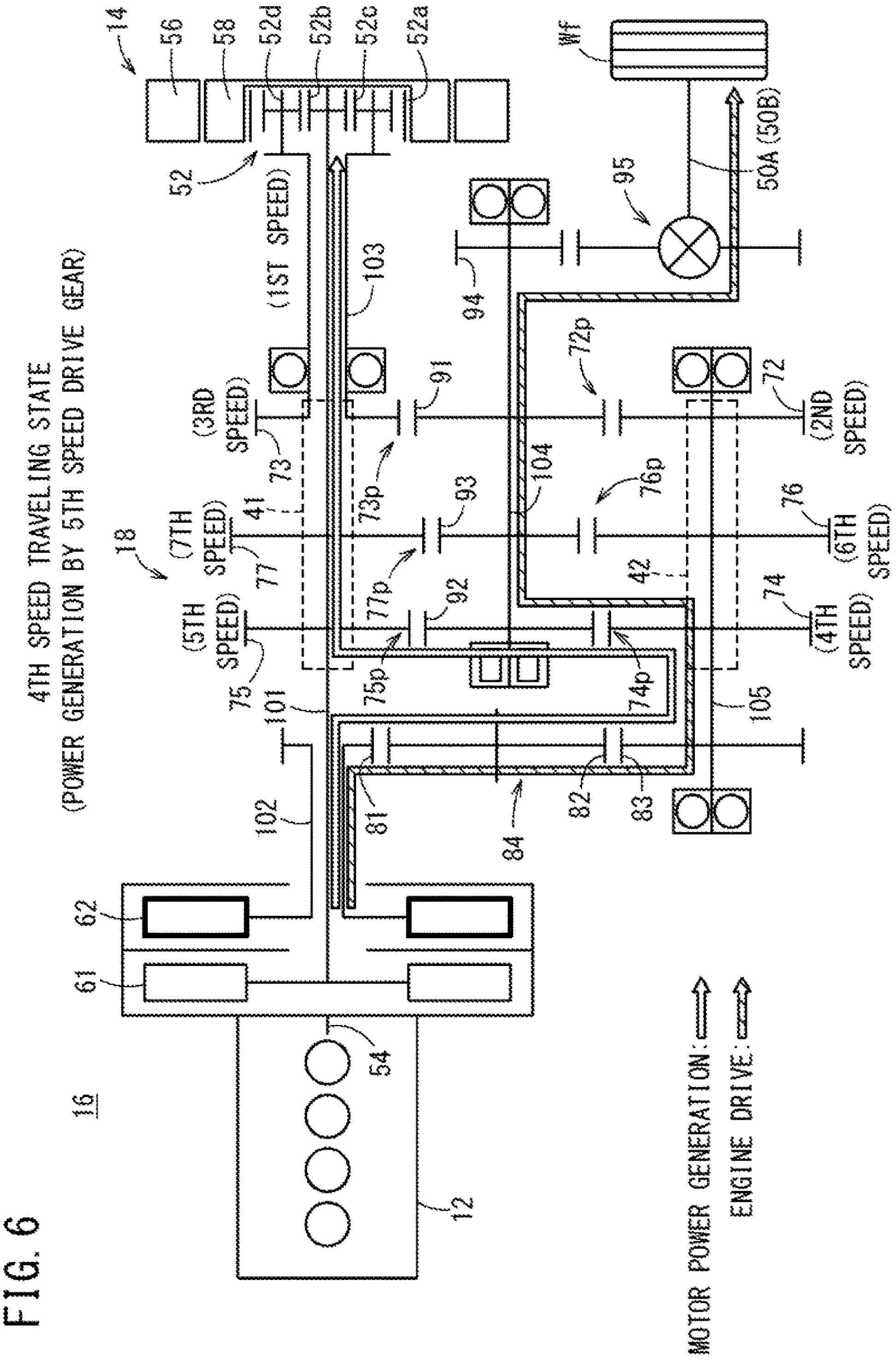
FIG. 6 is an outline schematic diagram of the front wheel drive device indicating a state in which the wheels are driven in fourth gear by an internal combustion engine, and power is generated by a fifth speed drive gear.

As shown in FIG. 6, during the steady state control in fourth gear at time t1 and before (hereinafter also referred to as a fourth speed traveling state), the second clutch 62 is engaged, and the front wheels Wf are driven through the fourth speed drive gear 74 via the first second main shaft 102 from the internal combustion engine 12, whereas the rotor 58, which is formed integrally with the first first main shaft 101 is rotated through the fifth speed drive gear 75, and the motor 14 generates a generated power Pgen=X. In FIG. 6, the hatched arrow indicates an engine drive path (a drive path of the front wheels Wf by the internal combustion engine 12), and the hollow white arrow indicates a motor power generation path (a path by which the motor 14 generates power upon rotation of the rotor 58 by the internal combustion engine 12).

Incidentally, in the state shown in FIG. 6 (fourth speed traveling state, state in which power generation of the motor 14 is performed by the fifth speed drive gear 75, the ECU 26 places the fifth speed drive gear 75, which is intended to be shifted next, in a state of rotating integrally with the first first main shaft 101, or stated otherwise, in a state in which a fifth speed synchronizing mechanism (not shown) is fastened, i.e., a so-called pre-shift completion state. For example, when a depression of the accelerator pedal in order to increase the vehicle speed is detected by the ECU 26, the ECU 26 releases the fourth speed drive gear 74 from the second second main shaft 105 through the second shift actuator 42, together with releasing (disconnecting) the second clutch 62, and carrying out an operation (switching engagement operation of the first and second clutches 61, 62) to engage or fasten the first clutch 61.

Figure 7:
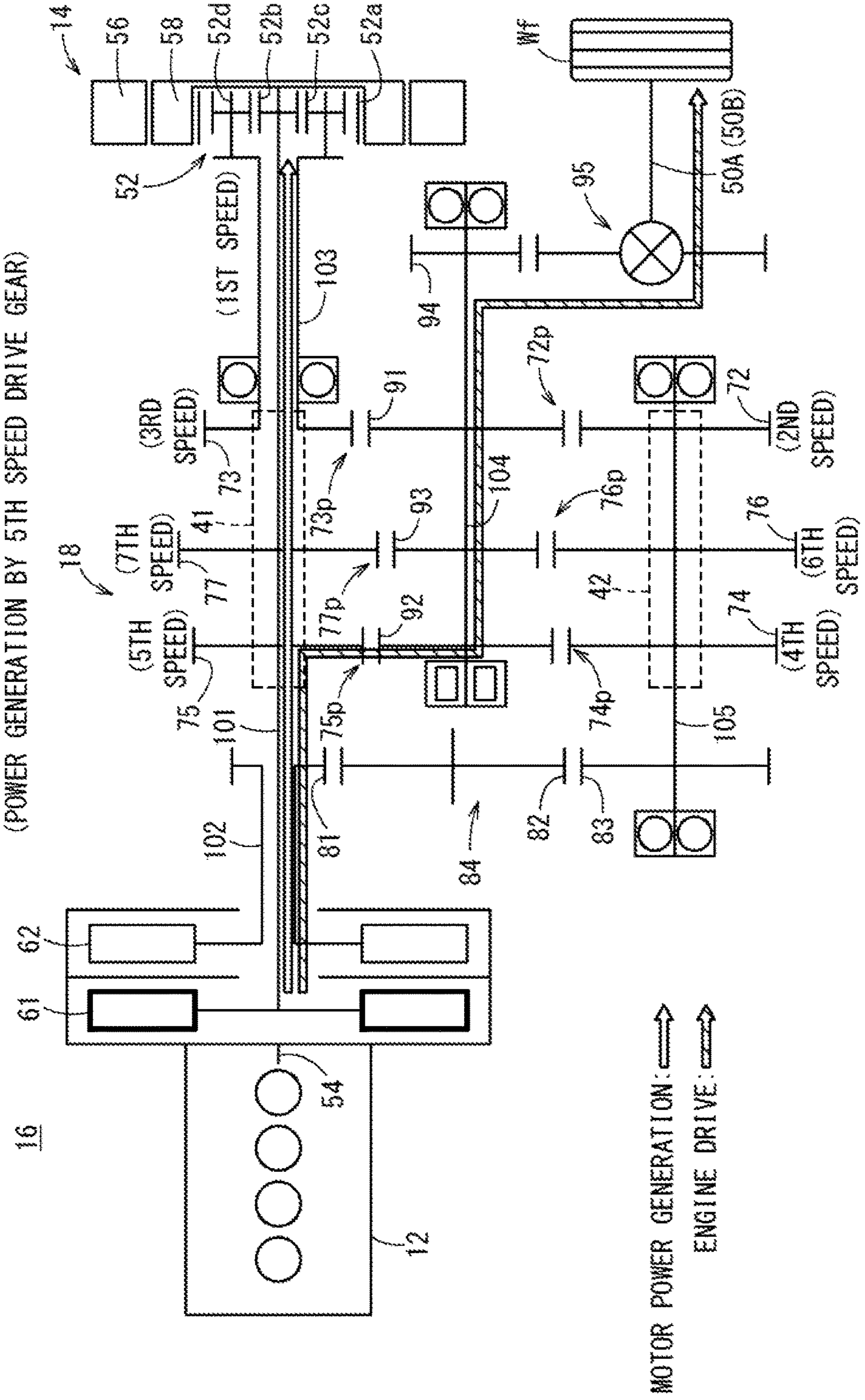
FIG. 7 is an outline schematic diagram of the front wheel drive device indicating a state in which the wheels are driven while being shifted into fifth gear from the fourth gear shown in FIG. 6, and power is generated by the fifth speed drive gear.

Consequently, as shown in FIG. 7, the transmission 18 can be switched from the fourth speed traveling state to the fifth speed traveling state, and driving of the front wheels Wf from the internal combustion engine 12 through the fifth speed drive gear 75 via the first first main shaft 101 (refer to the hatched arrow), as well as transitioning to the power generating state (hollow white arrow) of the motor 14 by rotary driving of the first first main shaft 101 (the fifth speed drive gear 75 also is rotated) can be carried out.

Returning to the control of the fourth speed traveling state (power generation by the fifth speed drive gear 75) shown in FIG. 6, in the period until time t1, it is determined whether or not there is a possibility for change to an odd-number stage gear to occur.

As discussed above, during power generation by the fifth speed drive gear 75 in the fourth speed traveling state shown in FIG. 6, in the event it is determined that there is a need for a shifting operation to the fifth gear as shown in FIG. 7, since a change of an odd-number stage gear does not occur (the odd-number stage gear does not change from the fifth speed drive gear 75), the control returns to the steady state control.

However, at time t1, for example, when reaching an uphill slope and the accelerator pedal starts to be depressed by the driver, or alternatively, under a cruise control (constant speed traveling control), when reaching an uphill slope and the throttle opening (in agreement with an accelerator pedal opening AP) starts to be increased by the ECU 26, when it is predicted by the ECU 26 that a change will occur from traveling in fourth gear to traveling in third gear and not to traveling in fifth gear, then by the ECU 26, at that moment, the determination of the possibility for changing to an odd-number stage gear, in which the fifth speed drive gear 75 that contributes to power generation is changed to the third speed drive gear 73, is made affirmative.

As shown in FIG. 5, at time t1, the ECU 26 sets (raises) an odd-number stage gear change flag Fodc.

Next, in order to perform switching smoothly from the fourth gear to the third gear, a pre-shifting operation is carried out by the ECU 26 from a state in which a fifth-speed synchronization mechanism (not shown) is engaged with the fifth speed drive gear 75 to a state in which a third-speed synchronization mechanism (not shown) is engaged with the third speed drive gear 73.

The pre-shifting operation is implemented in the period from time t1 to time t5. In this case, first, in the period from time t1 to time t2, an electricity-generating amount reduction control for reducing the electricity-generating amount of the motor 14, which is operated as a generator by motive power from the internal combustion engine 12, and a motor drive force reduction control for reducing the drive force of the left and right motors 22A, 22B are carried out.

In the electricity-generating amount reducing control, the ECU 26 gradually reduces the on duty ratio of the inverter 15 (which converts an AC power generated by rotation of the rotor 58 into a DC power) that is connected electrically to the motor 14, whereby the generated power Pgen of the motor 14 is gradually reduced from a generated power X. Together with the reduction in the generated power Pgen from the generated power X, corresponding to the reduction in the generated power Pgen, the motor drive force reduction control is carried out for gradually reducing the drive force (drive torque) of the left and right motors 22A, 22B.

In this manner, in the period from time t1 to time t2, the left and right total power Pmot of the left and right motors 22A, 22B is gradually reduced corresponding to the reduction in the generated power Pgen. Therefore, in the period from time t1 to time t2, the load electric power consumption Ps=Pmot+P1 is gradually reduced.

Next, after time t2, the ECU 26 determines whether or not an insufficient state of the generated power Pgen has been reached in which the load electric power consumption Ps cannot be covered by the generated power Pgen (|Ps|≥|Pgen|).

The control is continued when the load electric power consumption Ps can be covered by the generated power Pgen.

While the generated power Pgen and the left and right total power Pmot undergo a reduction from time t1, at time t2, the electric power [kW] of the left and right total power Pmot becomes a power equivalent to 0 [Nm].

In addition, after time t2, when a state is brought about in which the load electric power consumption Ps cannot be covered by the generated power Pgen that is being reduced, a portion of the discharge power (outflowing power) Pd (see FIG. 5) of the battery Pbat corresponding to such an insufficiency gradually increases after time t2.

After time t2, when the power of the left and right total power Pmot becomes less than 0 [Nm], a deceleration torque (negative torque) generated by the left and right motors 22A, 22B is reflected as a braking force with respect to the rear wheels Wr, leading to cases in which the vehicle occupants sense a "dragging feeling".

In order to avoid the occurrence of such a "dragging feeling", a 0 [Nm] control is initiated in which the left and right motors 22A, 22B are controlled so as not to generate deceleration torques, and are placed in a zero torque state, respectively, whereby the motor drive force reduction control (time t1 to time t2) is stopped.

While the 0 [Nm] control is carried out, as shown at time t3, when it is predicted or acquired (detected) that the discharge power Pd from the battery 24 has exceeded a threshold power Pdth1 [kW] (|Pbat|>|−Pdth1|), in order to protect the battery 24 and prevent the possibility of the battery 24 deteriorating by excessive discharging, at time t3, a 0 [kW] control implementation flag F0 is set (established), and the control is switched to a 0 [kW]control, in which power is not supplied to the left and right motors 22A, 22B and thus the left and right total power Pmot of the left and right motors 22A, 22B is made 0 [kW] (Pmot=0 [kW]) (i.e., the 0 [Nm] control, which started at time t2, is stopped at time t3, and the 0 [kW]control is started at time t3). More specifically, the on duty ratio of the inverters 23A, 23B is set to zero, and the switching operation of the inverters 23A, 23B, which have operated as converters, is halted.

Therefore, at time t3, the discharge power Pd that was expended for the 0 [Nm] control at time t3 is decreased rapidly by that amount, and after time t3, in the period up to time t4, while the battery power Pbat is gradually increased by an amount to ensure the auxiliary device load power P1 that consumes a constant power, and an amount to compensate for the decrease in the generated power Pgen, it is determined whether or not the generated power Pgen has become substantially zero (Pgen≅0).

At time t4, when the generated power Pgen becomes substantially zero (Pgen≅0 [kW]), or stated otherwise, when the electricity-generating amount reduction control that was initiated at time t1 comes to an end, by the first shift actuator 41 being operated by the ECU 26, the connection of the transmission drive gear (in this case, the fifth speed drive gear 75) with the first first main shaft 101 is released by releasing the fifth speed synchronising mechanism (not shown). As a result of this operation, the drive force from the second shared driven gear 92 that is disposed on the counter shaft 104 is not transmitted to the first first main shaft 101 through the fifth speed drive gear 75.

Next, after time t4, within a period until time t5 in which power generation cannot be performed, the inverter 15, which had been switched to an off state from the regeneration direction, is switched by the ECU 26 to the driving direction, whereupon the motor 14 is rotationally operated as a motor by the battery power Pbat of the battery 24, and the rotational speed of the first first main shaft 101 is increased.

In this manner, a rotational speed matching control is carried out by which the rotational speed of the first first main shaft 101 is increased until coming into the vicinity of a predetermined rotational speed of the third speed drive gear 73, which is an odd-number stage gear intended to be changed to.

At time t5 when the rotational speed of the first first main shaft 101 is increased to the rotational speed of the third speed drive gear 73, the first shift actuator 41 is operated by the ECU 26, whereby the third speed drive gear 73 is placed in a state of integral rotation with the first first main shaft 101, both members are fastened by the third-speed synchronisation mechanism (not shown), and the inverter 15 is switched to the regeneration direction.

At this time, the odd-number stage gear change flag Fodc is reset (off).

Figure 8:
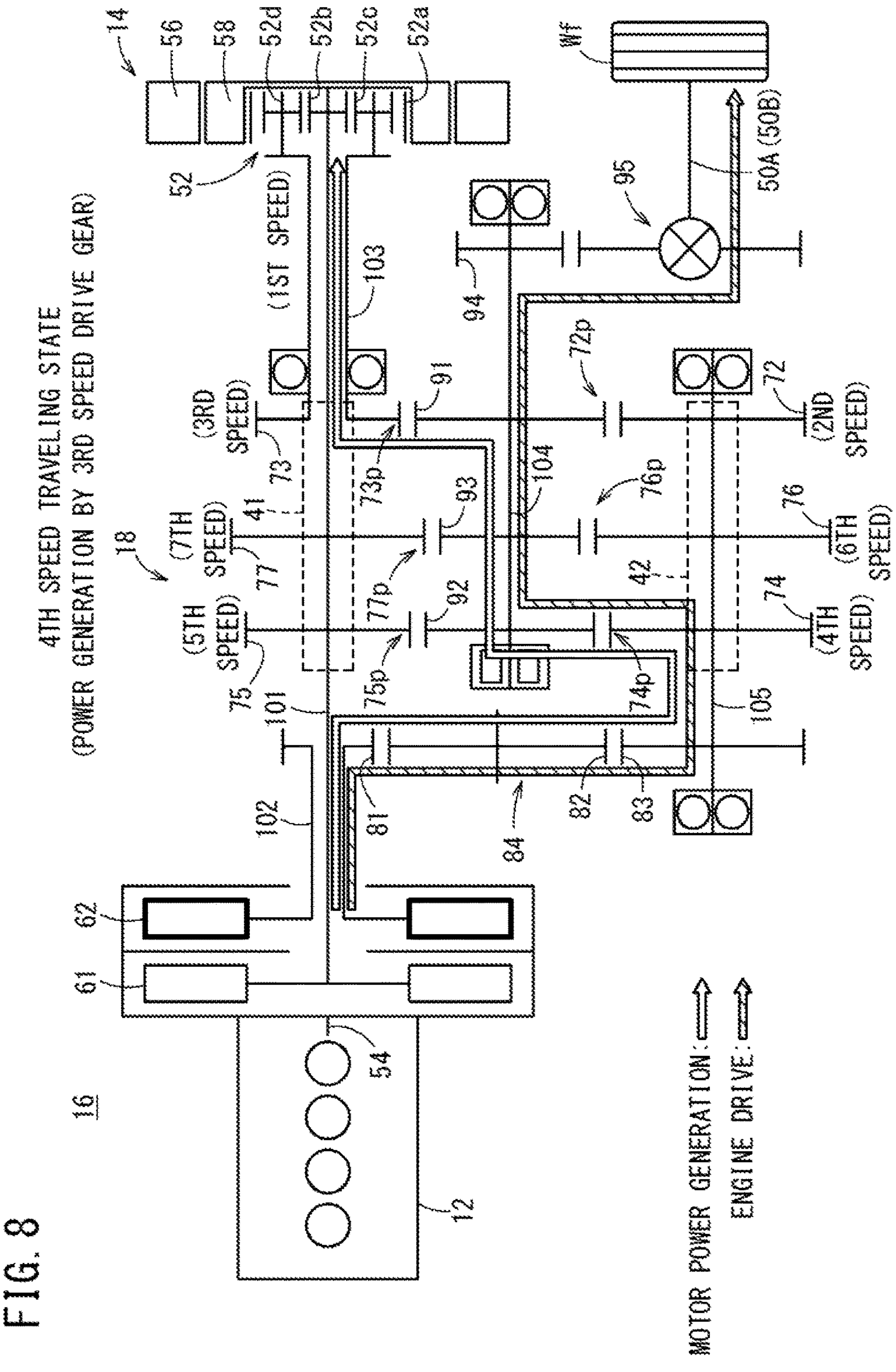
FIG. 8 is an outline schematic diagram of the front wheel drive device indicating a state after the fifth speed drive gear is changed to the third speed drive gear in the state in which the wheels are being driven in fourth gear as shown in FIG. 6.

In accordance with this operation, as shown in FIG. 8, at time t5, the third speed drive gear 73 and the first first main shaft 101 are rotated by rotary drive force of the counter shaft 104 through the first shared driven gear 91, and a pre-shift completion state is brought about, whereas the motor 14 resumes power generation as a generator.

In addition, at time t5, a control to increase the on duty ratio of the inverter 15 is carried out, whereby the generated power Pgen increases, and since the generated power Pgen can be used as the left and right total power Pmot for driving the left and right motors 22A, 22B, the battery power Pbat of the battery 24 is reduced by that amount.

It is determined whether or not the generated power amount of the motor 14, which is functioning as a generator, reaches a generated power amount that enables the left and right motors 22A, 22B to be subjected to the 0 [Nm] control, and at time t6 when 0 [Nm] is reached, the 0 [kW] control implementation flag F0 is reset, and the 0 [Kw] control that was initiated at time t3 is brought to an end.

Next, after time t6, the control to increase the generated power amount continues, and the left and right total power Pmot of the left and right motors 22A, 22B increases corresponding to the increase in the generated power Pgen. It is determined whether or not the generated power amount has reached a target generated power amount that serves as a target drive force, and at time t7 when the target generated power amount is reached, as shown in FIG. 9, the steady state control of the third speed traveling state (with power generation by the third speed drive gear 73) is entered into.

In the fourth speed traveling state (power generating state of the motor 14 by the third speed drive gear 73) shown in FIG. 8, for example, when depression of the accelerator pedal during traveling on an uphill slope is detected by the ECU 26, the ECU 26 releases the fourth speed drive gear 74 from the second second main shaft 105 through the second shift actuator 42, together with releasing (disconnecting) the second clutch 62, and carrying out an operation to engage or fasten the first clutch 61 (switching engagement operation of the first and second clutches 61, 62).

Figure 9:
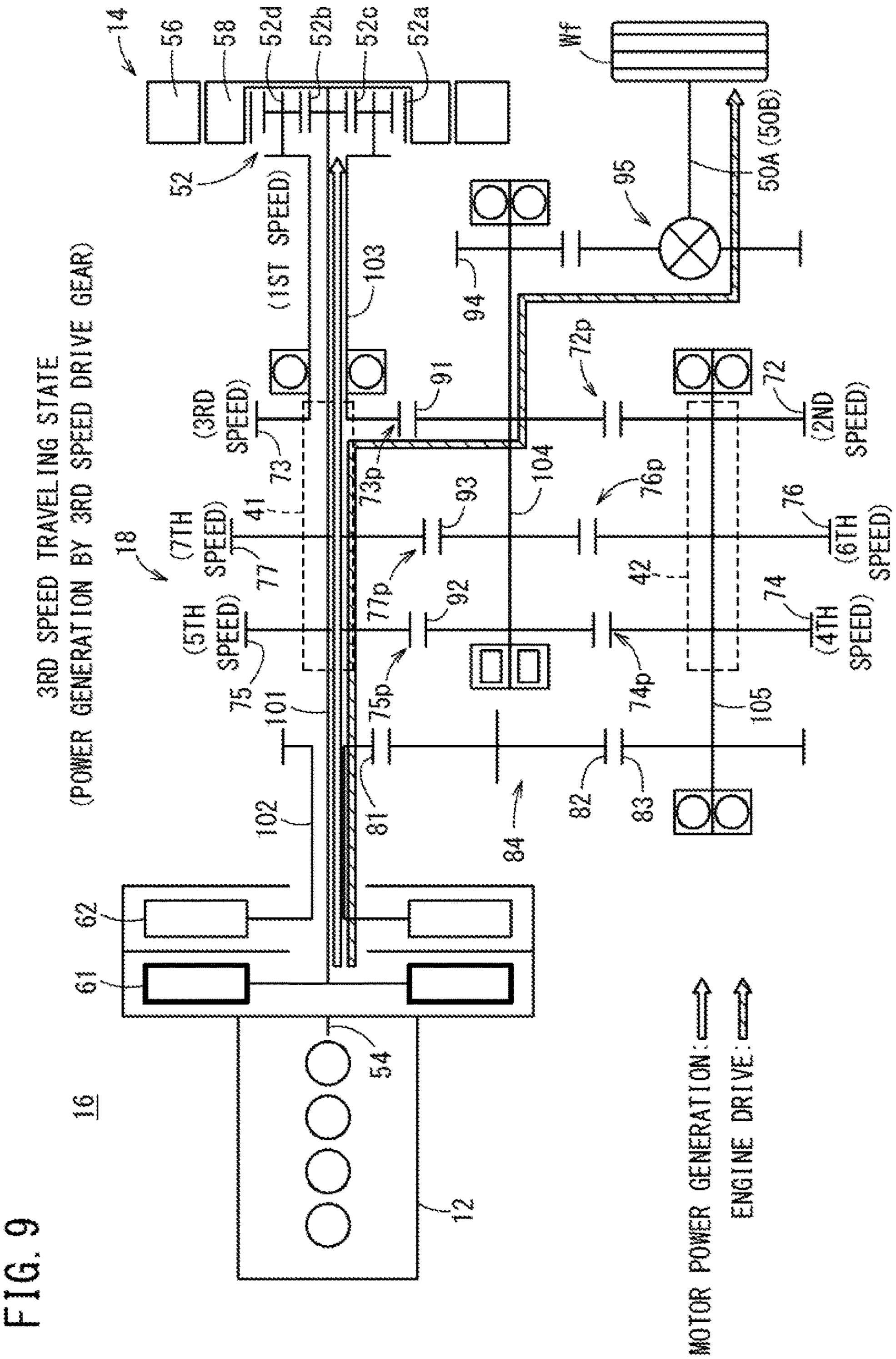
FIG. 9 is an outline schematic diagram of the front wheel drive device indicating a state in which the wheels are driven while being shifted into third gear from the fourth gear shown in FIG. 8, and power is generated by the third speed drive gear.

Consequently, as shown in FIG. 9, at a time that the transmission 18 is switched from the fourth speed traveling state to the third speed traveling state, driving of the front wheels Wf from the internal combustion engine 12 through the third speed drive gear 73 via the first first main shaft 101 (refer to the hatched arrow), as well as transitioning to the power generating state (blank white arrow) of the motor 14 by rotary driving of the first first main shaft 101 (the third speed drive gear 73 also is rotated) can be carried out.

Description of Discharge Characteristics (Discharge Limit) with Respect to the Battery Temperature Tb of the Battery 24

Figure 10:
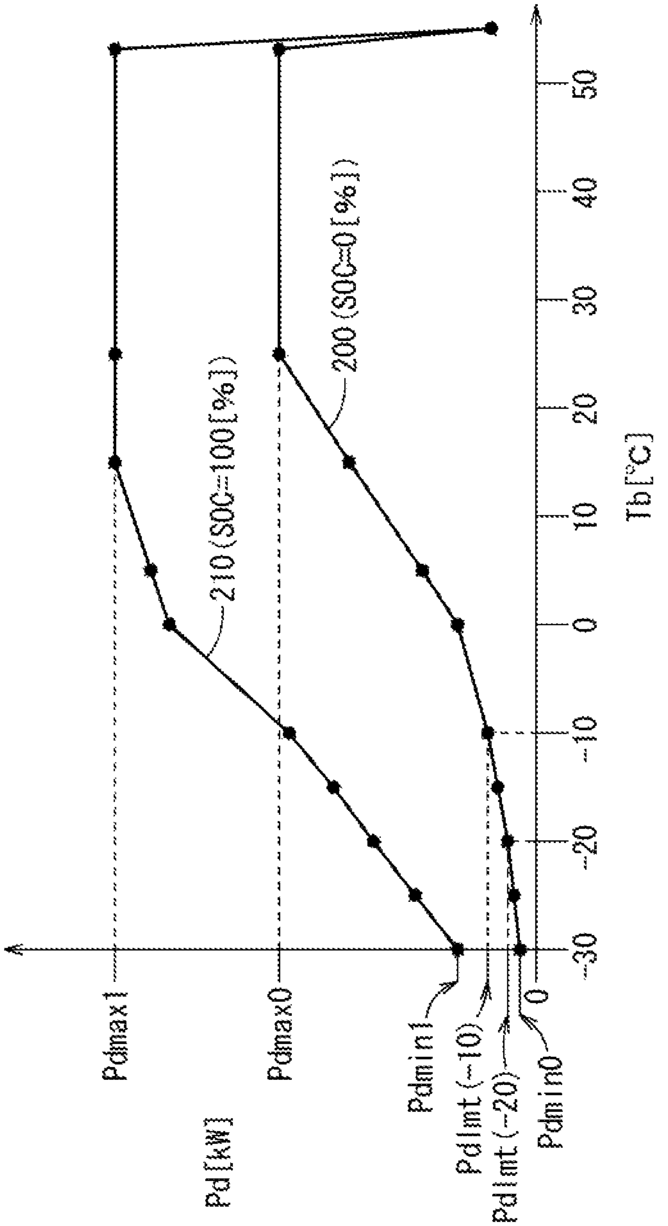
FIG. 10 is a characteristic diagram for describing a correspondence relationship between a battery temperature and a discharge limit power.

FIG. 10 shows discharge characteristics 200, 210 as examples of a correspondence relationship between the battery temperature Tb [° C.] and the discharge power Pd of the battery 24 [kW].

The discharge characteristic 200 is a characteristic of the discharge power Pd with respect to the battery temperature Tb when the SOC=0 [%], and the discharge characteristic 210 is a characteristic of the discharge power Pd with respect to the battery temperature Tb when the SOC=100 [%].

According to the discharge characteristic 200 for SOC=0 [%], from Tb=−30 [° C.] to a so-called normal temperature of Tb=25 [° C.], the discharge power Pd increases gradually from a discharge power of Pdmin0 to a discharge power of Pdmax0, and in a range from Tb=25 [° C.]to Tb−50 [° C.], becomes substantially a discharge current of Pdmax0.

According to the discharge characteristic 210 for SOC=100 [%], from Tb=−30 [° C.] to Tb=15 [° C.], the discharge power Pd increases gradually from a discharge power of Pdmin1 (Pdmin1>Pdmin0) to a discharge power of Pdmax1, and in a range from Tb=15 [° C.] to Tb=50 [° C.], becomes substantially a discharge current of Pdmax1 (Pdmax1>Pdmax0).

Characteristics whereby the SOC exceeds 0 [%] and is less than 100 [%], although not shown, are discharge characteristics that occur between the discharge characteristic 200 and the discharge characteristic 210.

As a point that should be borne in mind, firstly, in the vicinity of, for example, a battery temperature of Tb=−10 [° C.], on the discharge characteristic 200 of SOC=0 [%], the discharge characteristic Pd is limited by Pd=Pdlmt(−10) [kW], and if power is discharged (flows out) in excess of this limitation on the discharge current Pd, there is a concern that damage to the battery 24 may occur.

More specifically, by determining in advance the discharge characteristic 200 at SOC=0 [%] under the most severe conditions, at SOC>0, if an output from the battery is made while observing the limitation (rule) on the discharge characteristic 200, risk of damage to the battery 24 can be prevented beforehand, and deterioration of the battery 24 does not occur.

Description of Process for Protecting the Battery 24 by Suppressing the Discharge Power Pd [kW] of the Battery 24, and Enhancing Drivability in Relation to Turning as a Movement Performance of the Vehicle 10

Figure 11:
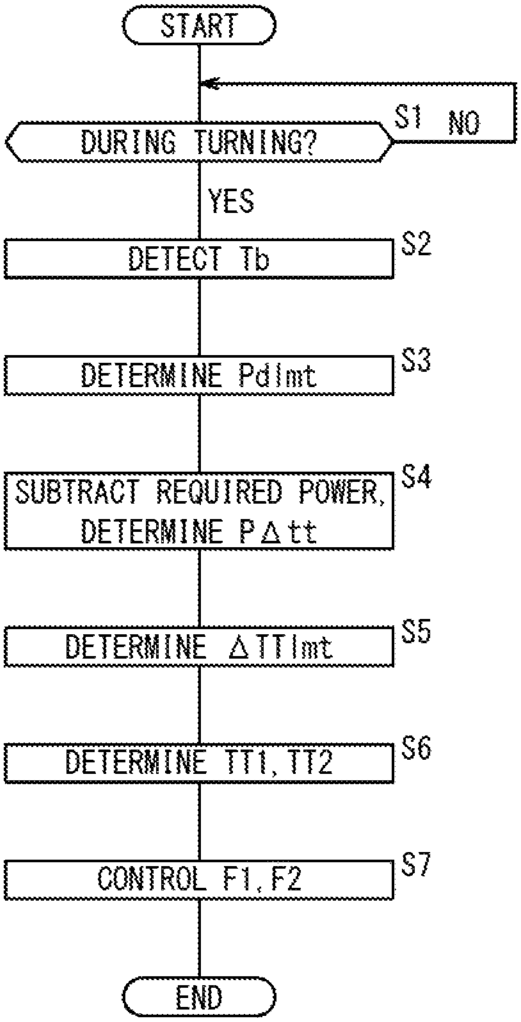
FIG. 11 is a flowchart for providing a description of operations of the present embodiment.

Descriptions will now be given with reference to the flowchart of FIG. 11. The execution subject of the program according to the flowchart is the CPU that constitutes the ECU 26.

In step S1, it is determined whether or not the vehicle 10 is currently making a turn by referring to the yaw rate, the steering angle of the steering wheel, or the slip acquisition devices 34, etc.

If it is determined that the vehicle is currently making a turn (step S1: YES), then in step S2, the battery temperature Tb of the battery 24 is detected through the battery temperature detector 25, and the battery temperature Tb, which was detected through the battery temperature detector 25, is read in. In the present example, it is assumed that the battery temperature was Tb=−20 [° C.].

In step S3, from the battery characteristics shown in FIG. 10, with reference to the discharge characteristic 200 of SOC=0 [%] with the SOC under the most severe conditions, the discharge limit power Pdlmt=Pdlmt(−20) is sought (determined) at the battery temperature Tb=−20 [° C.].

In step S4, a required power which is of higher priority for the vehicle 10 than a power PΔtt for generating performance of vehicle movement, i.e., a left/right differential torque, is subtracted from the determined discharge limit power Pdlmt (−20).

In this case, with reference to a power usage priority table 220 shown in FIG. 12, which is stored in the storage device 26M, according to the process of step S4, and as shown in the following equation (16), the low voltage auxiliary device load power Pll and a 0 [Nm] control power Pmot0 nm for effecting the 0 [Nm] control in the period from time t2 to time t3 in FIG. 5 are subtracted from the discharge limit power Pdlmt=Pdlmt(−20), and the remainder thereof is determined as the power PΔtt for generating the left and right differential torque.

$$P\Delta tt = \text{Pdlmt} - \text{Pll} - \text{Pmot0 nm}$$

$$P\Delta tt(-20) = \text{Pdlmt}(-20) - \text{Pll} - \text{Pmot0 nm} \quad (16)$$

Figure 13:
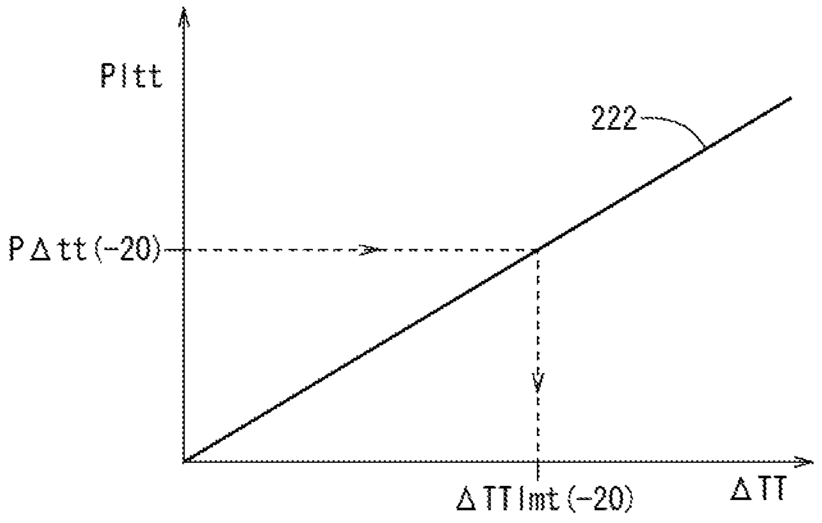
FIG. 13 is a characteristic diagram for describing a correspondence relationship between a target left and right differential torque and a motor power loss.

Next, with respect to the target left and right differential torque ΔTT (in FIG. 13, the horizontal axis) shown in FIG. 13, which is stored in the storage device 26M, a characteristic 222 of the power loss Pltt (in FIG. 13, the vertical axis) accompanying generation of the left and right differential torque is referred to, and in step S5, on the basis of the power loss Pltt corresponding to the power PΔtt(−20) (in FIG. 13, the value in the vertical axis) for generating the left and right differential torque, which was determined by equation (16), a differential torque upper limit value ΔTTlmt(−20) (in FIG. 13, the value in the horizontal axis), which is the upper limit value of the target left and right differential torque ΔTT, is determined.

Figure 14:
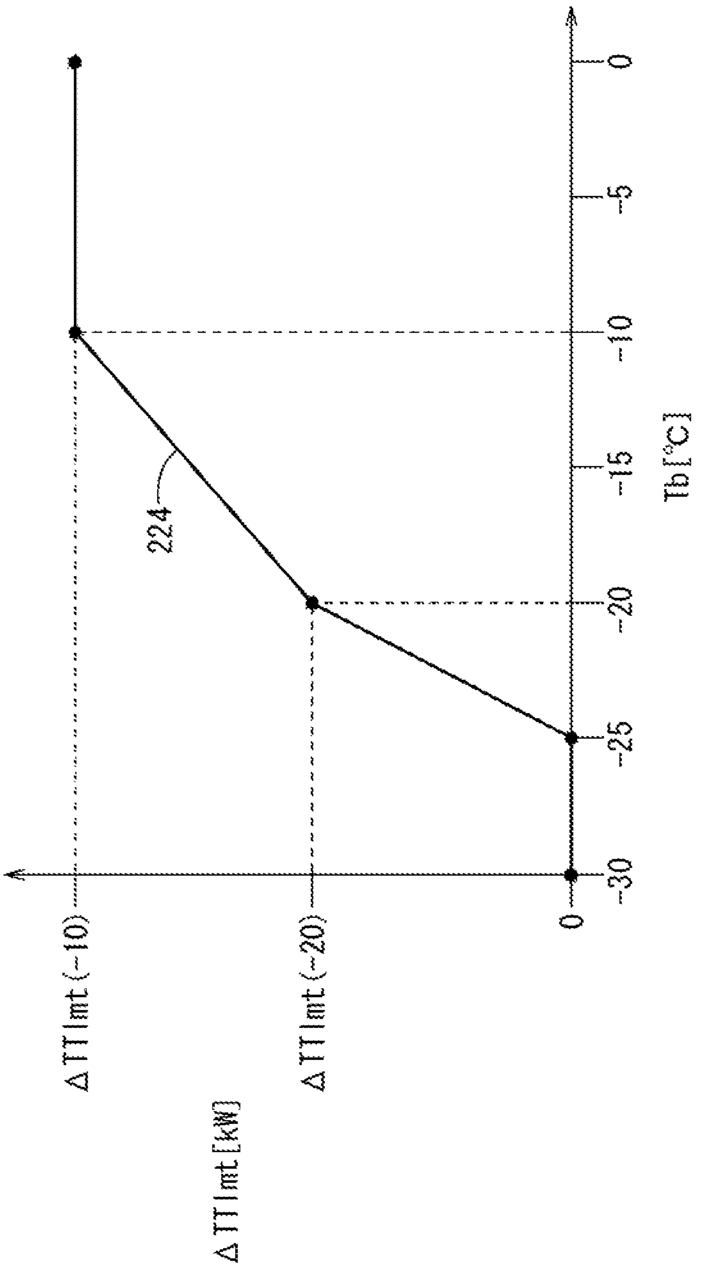
FIG. 14 is a characteristic diagram for describing a correspondence relationship between the battery temperature and a differential torque upper limit value.

In this manner, the differential torque upper limit value ΔTTlmt(−20) [kW] for the case in which the battery temperature Tb of FIG. 14 is Tb=−20 [° C.] is determined.

Below, in a similar manner, other differential torque upper limit values ΔTTlmt are determined on the basis of other battery temperatures Tb, and characteristics 224 of the differential torque upper limit values ΔTTlmt shown in FIG. 14 are obtained and stored in the storage device 26M.

According to the characteristics 224 of the differential torque upper limit values ΔTTlmt, within a range in which the battery temperature Tb is less than −25 [° C.], the differential torque upper limit value ΔTTlmt is rounded to a zero value (ΔTTlmt=0 [kW]), within a range in which the battery temperature Tb exceeds −10 [° C.], the differential torque upper limit value ΔTTlmt is determined such that the differential torque upper limit value ΔTTlmt(Tb)=ΔTTlmt (−10), and between −25 [° C.] and −10 [° C.], intermediate values thereof are adopted.

In the foregoing manner, within a range in which the determined differential torque upper limit value ΔTTlmt(Tb)=ΔTTlmt(−20) is not exceeded, in step S6, the target left and right differential torque ΔTT=TT1−TT2 of the rear wheels Wr is determined, and the target torques TT1, TT2 are determined. Moreover, in accordance with the 0 [Nm]control power Pmot0 nm of priority "2" (see FIG. 12), the target left and right sum torque TRT is narrowed by the equation TRT=TT1+TT2=0 [Nm].

In step S7, the target torques TM1, TM2 of the left and right motors 22A, 22B are set in accordance with the target torques TT1, TT2 of the rear wheels Wr, and the left motive force F1 and the right motive force F2 of the left and right motors 22A, 22B can be controlled (refer to equation (9) and equation (10) discussed above).

In the foregoing manner, according to the present embodiment, when the output power is limited, for example, by the battery 24 being at a low temperature or the like, by controlling the difference (instead of a difference, a ratio may also be controlled) between the left motive force F1 and the right motive force F2 on the basis of such a limitation, fear of damage to the battery 24 due to excessive power discharging or the like can be prevented, while the turning performance of the vehicle 10 can be ensured by carrying out the turning directional control.

Modification

Figure 15:
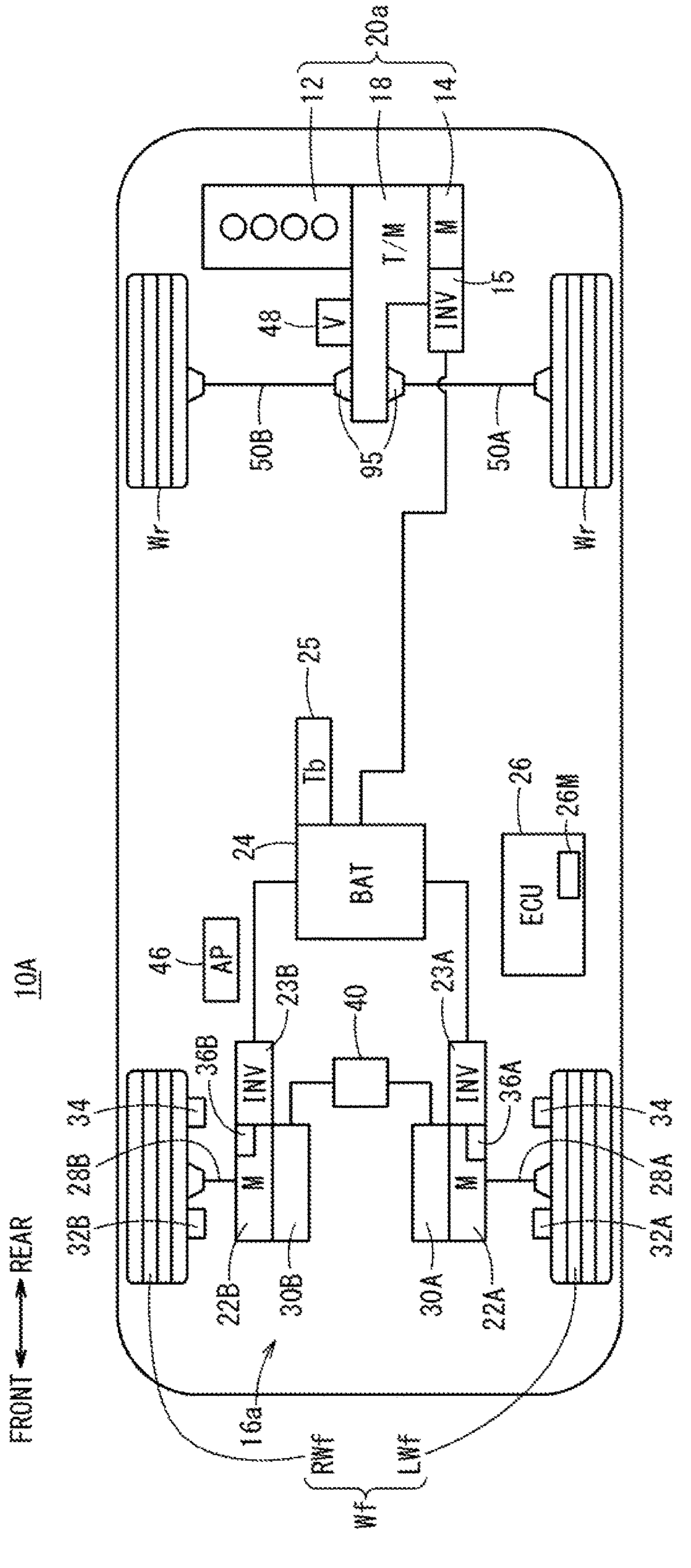
FIG. 15 is a block diagram showing in outline the configuration of a vehicle according to a modification of the present invention.

FIG. 15 is a block diagram showing in outline the configuration of a vehicle 10A according to a modification of the present invention. In the vehicle 10A shown in FIG. 15, the configurations of the front wheel drive device 16 and the rear wheel drive device 20 in the vehicle 10 are reversed in the forward/rearward direction. More specifically, a front wheel drive device 16*a* of the vehicle 10A comprises the left and right motors 22A, 22B for driving the left and right front wheels Wf (LWf, RWr) arranged on the front side of the vehicle 10A. Further, a rear wheel drive device 20*a* of the vehicle 10A comprises the motor 14, which is connected in series through the transmission 18 to the internal combustion engine 12 arranged on the rear side of the vehicle 10A, for driving the rear wheels Wr.

With respect to the vehicle 10A as well, at a time that the above-described odd-number stage gears are changed, an operation can be performed to prevent generation of unnecessary deceleration torques in the left and right motors 22A, 22B, and when turning, the differential torque control can be applied while protecting the battery 24 at low temperatures.

Summary of the Present Embodiment, Other Modifications

As has been described above, the vehicle 10, 10A according to the above-described embodiments is equipped with the left motor 22A connected mechanically to a left wheel, for example, a left rear wheel LWr, and a right motor 22B connected mechanically to a right rear wheel RWr that is a right wheel paired with the left rear wheel LWr, the battery 24 as an energy storage device connected electrically to the left motor 22A and the right motor 22B, and the ECU 26 as a motor control device that controls a left motive force F1 and a right motive force F2, which are motive forces generated by the left motor 22A and the right motor 22B.

The ECU 26 controls the left motive force F1 and the right motive force F2 of the left motor 22A and the right motor 22B so as not to exceed the differential torque upper limit value ΔTTlmt, which is a maximum value of the difference (can be converted to the target left and right differential torque ΔTT, or may be a ratio) between the left motive force F1 and the right motive force F2, which is determined on the basis of a temperature (battery temperature Tb) of the battery 24 or the discharge limit power Pdlmt as a maximum output power of the battery 24.

In this manner, when the discharge power Pd, which is an output power, is limited by the battery 24 being at a low temperature or the like, by controlling the difference (difference, ratio) between the left motive force F1 and the right motive force F2 on the basis of the discharge limit power Pdlmt, damage to the battery 24 can be prevented, while the turning performance of the vehicle 10 can be enhanced by carrying out the turning directional control of the vehicle 10, 10A.

In this case, the ECU 26 determines the differential torque upper limit value ΔTTlmt, which is a maximum value of the aforementioned difference, on the basis of the power PΔtt for generating the left and right differential torque as a consumable power that can be consumed by the left motor 22A and the right motor 22B, which is determined based on the battery temperature Tb of the battery 24 or the discharge limit power Pdlmt of the battery 24, and the characteristic 222 (see FIG. 13) showing the correspondence relationship between the difference (can be converted to the target left and right differential torque ΔTT, or may be a ratio) between the left motive force F1 and the right motive force F2 and the power loss Pltt when such a difference is generated, whereby the discharge limit power Pdlmt as a maximum power output of the battery 24 can be protected more reliably.

In this case, when the left motor 22A and the right motor 22B are controlled so as not to exceed the differential torque upper limit value ΔTTlmt as a maximum value of the aforementioned difference, the ECU 26 controls the left motor 22A and the right motor 22B so that a sum total of the left motive force F1 and the right motive force F2 becomes substantially zero ($F1+F2 \cong 0$, i.e., $P1+P2 \cong 0$) Thus, it is possible for the power consumed by the left and right motors 22A, 22B in total to be reduced, and for the differential torque upper limit value ΔTTlmt as a maximum value of the left and right difference to be increased in value.

Further still, in the case that the vehicle 10, 10A is equipped with the motor 14 which functions as a generator that is driven by the internal combustion engine 12 and is capable of charging the battery 24, during traveling of the vehicle 10, 10A, when it is predicted (at time t1) that a time period (the time period from time t4 to time t5 in FIG. 5) in which power generation of the motor 14 functioning as a generator is impossible will occur, and during such a time period (time t4 to time t5) in which generation of power cannot be performed, the ECU 26 controls the left motive force F1 and the right motive force F2 of the left motor 22A and the right motor 22B so as not to exceed the differential torque upper limit value ΔTTlmt, which is a maximum value of the difference (can be converted to the target left and right differential torque ΔTT, or may be a ratio) between the left motive force F1 and the right motive force F2, which is determined based on the battery temperature Tb of the battery 24 or the discharge limit power Pdlmt as a maximum power output of the battery 24. Thus, even in the time period (time t4 to time t5) in which power generation of the motor 14 functioning as a generator is impossible, damage to the battery 24 can be prevented, while the turning performance of the vehicle 10, 10A can be maintained by carrying out the turning directional control.

Concerning the period in which power generation cannot be performed, to explain in greater detail, in the case that the motor 14 that functions as a generator is generating power in accordance with motive power from the first and second first main shafts 101, 103, which serve as first input shafts of the double clutch transmission 18, or in accordance with the first and second second main shafts 102, 105, which serve as second input shafts of the double clutch transmission 18, at a time that rotational speed matching of the next gear is carried out by operating the motor 14, which functions as a generator during shifting, as a motor, the motor 14, which is functioning as a generator, enters a power generation limiting condition during which the necessary electric power cannot be generated.

As in the aforementioned embodiments, the present invention is not limited to the vehicle 10, 10A (all-wheel drive vehicle) in which, while the rear wheels Wr (or the front wheels Wf) are driven by the left and right motors 22A, 22B, the motor 14 is capable of being operated as a generator through the transmission 18 by the internal combustion engine 12, while simultaneously, the front wheels Wf (or the rear wheels Wr) are capable of being driven through the transmission 18 by the internal combustion engine 12.

For example, based on the disclosed content of the present specification, it is a matter of course that various configurations may be adopted whereby, for example, the invention is applied to a so-called (pure) series hybrid vehicle or a range extender vehicle or the like, in which rear wheel drive traveling (or front wheel drive traveling) or all-wheel drive traveling is carried out that causes a generator to generate electricity from the internal combustion engine 12 (i.e., the front wheels Wf and the rear wheels Wr are not driven by the internal combustion engine 12 through the transmission 18), while the rear wheels Wr (or the front wheels Wf) are being driven by the left and right motors 22A, 22B.

The invention claimed is:

1. A vehicle comprising:

a left motor connected mechanically to a left wheel, and a right motor connected mechanically to a right wheel paired with the left wheel;

an energy storage device connected electrically to the left motor and the right motor; and a motor control device configured to control a left motive force and a right motive force, which are motive forces generated by the left motor and the right motor, respectively;

wherein the motor control device is configured to control the left motive force and the right motive force of the left motor and the right motor to generate a difference between the left motive force and the right motive force to facilitate turning of the vehicle such that the difference between the left motive force and the right motive force does not exceed an upper limit value of the difference between the left motive force and the right motive force, the upper limit value being determined based on a consumable power that is capable of being consumed by the left motor and the right motor for generating the difference between the left motive force and the right motive force, the consumable power being determined on a basis of a maximum output power of the energy storage device determined at least from a temperature of the energy storage device.

2. The vehicle according to claim 1, wherein the motor control device is configured to determine the upper limit value of the difference further based on a correspondence relationship between (a) the difference between the left motive force and the right motive force and (b) a power loss at a time that the difference is generated.

3. The vehicle according to claim 1, wherein when the left motor and the right motor are controlled such that the difference between the left motive force and the right motive force does not exceed the upper limit value of the difference, the motor control device is configured to control the left motor and the right motor so that a sum total of the left motive force and the right motive force becomes substantially zero.

4. The vehicle according to claim 1, wherein:

the vehicle comprises an internal combustion engine and a generator configured to be driven by the internal combustion engine and connected electrically to the energy storage device, the generator being also configured to serve as a motor; and at a time that the vehicle is currently traveling, and occurrence of a period in which the generator serves as the motor and cannot generate electricity is predicted or detected, then within the period in which electricity cannot be generated, the motor control device is configured to control the left motive force and the right motive force of the left motor and the right motor such that the difference between the left motive force and the right motive force does not exceed the upper limit value of the difference between the left motive force and the right motive force, the upper limit value being determined on a basis of the maximum output power of the energy storage device determined at least from the temperature of the energy storage device.

5. The vehicle according to claim 2, wherein when the left motor and the right motor are controlled such that the difference between the left motive force and the right motive force does not exceed the upper limit value of the difference, the motor control device is configured to control the left motor and the right motor so that a sum total of the left motive force and the right motive force becomes substantially zero.

6. The vehicle according to claim 2, wherein:

the vehicle comprises an internal combustion engine and a generator configured to be driven by the internal combustion engine and connected electrically to the energy storage device, the generator being also configured to serve as a motor; and at a time that the vehicle is currently traveling, and occurrence of a period in which the generator serves as the motor and cannot generate electricity is predicted or detected, then within the period in which electricity cannot be generated, the motor control device is configured to control the left motive force and the right motive force of the left motor and the right motor such that the difference between the left motive force and the right motive force does not exceed the upper limit value of the difference between the left motive force and the right motive force, the upper limit value being determined on a basis of the maximum output power of the energy storage device determined at least from the temperature of the energy storage device.

7. The vehicle according to claim 3, wherein:

the vehicle comprises an internal combustion engine and a generator configured to be driven by the internal combustion engine and connected electrically to the energy storage device, the generator being also configured to serve as a motor; and at a time that the vehicle is currently traveling, and occurrence of a period in which the generator serves as the motor and cannot generate electricity is predicted or detected, then within the period in which electricity cannot be generated, the motor control device is configured to control the left motive force and the right motive force of the left motor and the right motor such that the difference between the left motive force and the right motive force does not exceed the upper limit value of the difference between the left motive force and the right motive force, the upper limit value being determined on a basis of the maximum output power of the energy storage device determined at least from the temperature of the energy storage device.

8. The vehicle according to claim 5, wherein:

the vehicle comprises an internal combustion engine and a generator configured to be driven by the internal combustion engine and connected electrically to the energy storage device, the generator being also configured to serve as a motor; and at a time that the vehicle is currently traveling, and occurrence of a period in which the generator serves as the motor and cannot generate electricity is predicted or detected, then within the period in which electricity cannot be generated, the motor control device is configured to control the left motive force and the right motive force of the left motor and the right motor such that the difference between the left motive force and the right motive force does not exceed the upper limit value of the difference between the left motive force and the right motive force, the upper limit value being determined on a basis of the maximum output power of the energy storage device determined at least from the temperature of the energy storage device.

9. A vehicle comprising:

a left motor connected mechanically to a left wheel, and a right motor connected mechanically to a right wheel paired with the left wheel;

an energy storage device connected electrically to the left motor and the right motor; and a motor control device configured to control a left motive force and a right motive force, which are motive forces generated by the left motor and the right motor, respectively;

wherein the motor control device is configured to control the left motive force and the right motive force of the left motor and the right motor such that a difference between the left motive force and the right motive force does not exceed a maximum value of the difference between the left motive force and the right motive force, the maximum value being determined on a basis of a maximum output power of the energy storage device determined at least from a temperature of the energy storage device, wherein the motor control device is configured to determine the maximum value of the difference further based on (i) a consumable power that is capable of being consumed by the left motor and the right motor, the consumable power being determined on a basis of the maximum output power of the energy storage device determined at least from the temperature of the energy storage device, and (ii) a correspondence relationship between (a) the difference between the left motive force and the right motive force and (b) a power loss at a time that the difference is generated.

* * * * *